US005737168A

United States Patent [19]
Baker

[11] Patent Number: 5,737,168
[45] Date of Patent: Apr. 7, 1998

[54] ELECTRICAL POWER MANAGEMENT SYSTEM

[76] Inventor: George T. Baker, 510 Hackberry Dr., Fairview, Tex. 75069

[21] Appl. No.: 434,662

[22] Filed: May 4, 1995

[51] Int. Cl.$^6$ .................................................. H02H 3/20
[52] U.S. Cl. ........................... 361/90; 361/84; 361/91; 361/92
[58] Field of Search .......................... 361/88–90, 78, 361/77, 84, 86, 42, 59, 73; 324/503; 307/127

[56] References Cited

U.S. PATENT DOCUMENTS

| | | | |
|---|---|---|---|
| 3,946,282 | 3/1976 | Weiss et al. | 361/77 |
| 4,507,713 | 3/1985 | Hsieh | 361/90 |
| 4,951,171 | 8/1990 | Tran et al. | 361/90 |
| 4,980,791 | 12/1990 | Alberkrack et al. | 361/90 |
| 4,999,730 | 3/1991 | Pickard | 361/59 |
| 5,117,325 | 5/1992 | Dunk et al. | 361/73 |
| 5,243,324 | 9/1993 | Bober | 340/439 |
| 5,319,514 | 6/1994 | Walsh et al. | 361/59 |
| 5,332,958 | 7/1994 | Sloan | 320/13 |

OTHER PUBLICATIONS

Brochure entitled, *The Lectric–Shield LSRV30/130 Surge Protector,* Outdoor Adventures.
Brochure entitled, *115 Volt, 30 Amp Voltage Monitor Voltage Controlled Circuit Breaker for Protecting Appliances in your Recreational Vehicles,* Shore Power, Inc.
Brochure entitled, *Power Line Monitor PLM–1,* RV Electronics.
Brochure entitled, *Power Line Monitor PLM–2,* RV Electronics.

*Primary Examiner*—Jeffrey A. Gaffin
*Assistant Examiner*—Sally C. Medley
*Attorney, Agent, or Firm*—Locke Purnell Rain Harrell

[57] ABSTRACT

A control system used to monitor an AC power source connected to AC powered user equipment. The control system is designed to monitor the output voltages of the AC power source to ensure that they are maintained within a predetermined operating window consisting of a high voltage limit and a low voltage limit. If the voltages stray outside the operating window the control system activates a normally closed DC relay to disconnect the AC power source from the AC powered user equipment. The disconnection is immediate for voltages that stray above the high voltage limit and only occurs after a short delay for voltages below the low voltage limit. The control system also monitors the AC power source connection to the AC powered user equipment to ensure that no polarization errors exist in the connection. A polarization error exists when the output conductors of the AC power source are connected to the wrong input conductors of the AC powered user equipment or when one or more conductors of the AC power source are not connected at all. The control system immediately disconnects the AC power source when a polarization error is detected. The control system is able to reconnect power to the AC powered user equipment after a minimum delay time has elapsed when it determines that the voltage is within the operating window again or the polarization error has been corrected. The control system is powered by an independent DC power supply separate from the AC source being monitored.

17 Claims, 16 Drawing Sheets

ELECTRICAL POWER MANAGEMENT SYSTEM

TECHNICAL FIELD OF THE INVENTION

The invention relates to a system to protect mobile electrical systems, such as those used in recreational vehicles, from polarization errors and dangerous voltage levels at remote power supply sites.

BACKGROUND OF THE INVENTION

Owners of recreational vehicles ("RVs"), campers, house boats, and the like, face problems with respect to their electrical systems to which occupants of residential properties are immune. Occupants of residential properties need be concerned only with the integrity and stability of the power delivered by their local power company. That power tends to be well regulated, very reliable, and permanently connected. Owners of RVs, however, as they travel around the countryside, trust their homes, electrical equipment, and even their lives to campground power systems. At each location, the RV is plugged into an unfamiliar system whose configuration, status and performance are unknown to the RV owner.

The National Electrical Code (NEC) specifies wiring connections and allowable voltage levels for electrical power installations in campgrounds and RVs. Unfortunately, NEC requirements are not uniformly enforced, the result being that incorrect wiring connections and/or excessively high or low line voltages are more nearly the rule than the exception at many campgrounds. In the interests of economy, many campgrounds are initially designed with barely adequate wiring systems whose performance rapidly degrades with growth and increased occupancy. Even correct installations can become dangerous due to accidents, loose connections or aging equipment.

The problem of polarization errors is one that is extremely important in mobile electrical systems like RVs, but it is one that has been largely ignored. NEC requirements mandate that the electrical systems in the RV and in campgrounds have specified power conductors connected to specified connector terminals. If any conductors are miswired or disconnected, a polarization error exists and damage to persons and appliances may be imminent. As a consequence the grounding conductor ("ground") of the power system must be connected both to the RV chassis and to a master campground earth grounding system. Since the RV is insulated from the earth by its rubber tires, potentially lethal situations can occur. If the outside power source is miswired, it is highly probable that the chassis of the RV will be placed at a large AC voltage with respect to the earth. Anyone touching the RV in this situation would be shocked and possibly electrocuted. Even if a potentially lethal condition is not present, polarization errors can cause serious damage to the equipment and appliances on the RV, resulting in financial loss for the RV owner.

The other power system problem concerning the owners of mobile electrical systems involves the stability of the power line voltage(s) delivered to the campground parking site. The NEC requires that power wiring be installed of such current capacity that under full load, the maximum voltage excursion seen at the end-user's location does not exceed plus or minus five percent of the nominal 120 volts of the incoming power service to the campground. Thus, line voltages higher than 126 volts or lower than 114 volts on a line wire (with respect to neutral) fail to meet the Code tolerance to which most electrical appliances are designed.

Excessively high line voltage can destroy electronic devices such as televisions, computers, and video cassette recorders. Particularly vulnerable are the solid-state control circuits of the modern appliances commonly installed on RVs. Excessively low line voltage can cause problems for equipment utilizing motors, such as air conditioner and refrigerator compressors. These motors draw large starting currents before reaching a running level at which the current drain is much lower. At low voltage levels the motor can draw a high starting current for extended periods causing the motor to overheat and burn out.

The very nature of RVs and other equivalent mobile electrical systems, means that they are often left unattended, but otherwise in operation, for long periods. This requires that any power management system must provide continuous, automatic monitoring and must be able to intervene immediately when a fault condition is present by removing power from the RV electrical system.

Existing solutions to the problems faced by mobile electrical systems include voltage meters to observe voltage levels and so-called "polarity" checkers to disclose the presence of polarization errors. These solutions require action by the user when fault conditions are detected if any benefit is to be obtained. The voltage meter simply reads the average voltage present on the line; it may have a warning feature to alert the owner. The polarity checker usually takes the form of simple indicator lights connected in various combinations among the wires of the power circuit. A chart is provided with the checker to show which pattern of lights corresponds to the correct wiring polarity. Unless the user is watching the checker constantly, there is no warning of an intermittent or accidental polarization error. Simple polarity checkers are unavailable for the four-wire power circuits used with large motorcoaches and boats. Neither of these options provides the automatic, continuous protection required by the RV environment.

Other more advanced systems provide automatic voltage monitoring and disconnection when over or under voltage conditions are present. None of these systems provides any type of polarization checking and all suffer from other flaws. All these types of systems use the monitored AC line to provide operating power for the monitoring circuitry and the AC contactors or relays which connect power. Using the controlled line to power the control system presents problems because the effectiveness of the control depends on the exact Status and condition of the controlled circuit, both of which may be changing continually. Additionally, the use of AC contactors or relays for line-powered service connection presents the hazard of armature chatter at reduced line voltages, with the resultant intermittent or erratic contactor-point operation and arcing. Such contact behavior subjects the devices connected on the power circuit to high-amplitude transient spikes of voltage which have the capability to damage sensitive equipment.

In addition to external 120 volt commercial AC power, many RVs use self-contained engine-driven AC power generators and/or power inverters driven from onboard batteries. These types of devices, especially power inverters, can generate non-sinusoidal waveforms of current and voltage which can cause problems for existing power monitors.

One such advanced system is disclosed in U.S. Pat. No. 4,999,730, issued on Mar. 12, 1991 to Pickard. Pickard discloses a line voltage monitor and controller. The system connects AC powered user equipment to an AC power line whenever the AC power line voltage is within a predetermined voltage window. Pickard's system suffers from the same flaws that other prior art system suffer.

First, Pickard lacks wiring polarization fault detection and control. Pickard's system cannot ensure that the correct wiring configuration has been applied to the system, and thus that it would not subject an RV owner and RV appliances to the potential dangers already described.

Second, Pickard's circuit uses a single, line-powered regulated power source for (a) the reference voltages, (b) operating power for all the electronic components, and (c) operating power for the connection relay itself. As shown in his specification, the highly critical comparator reference voltage levels would shift with any changes of power source load current since the three-terminal regulator, shown by reference numeral 68, is unable to maintain constant output voltage with major changes in load current. This variation would translate in variations in the voltage window and inconsistent performance.

Third, Pickard uses a normally open DC relay which is closed to connect power to the load. This configuration strips the user of control in the case of a problem with the system. A failure in the system would disconnect power without providing any information to the user to indicate what had occurred. If the Pickard system is permanently wired in the circuit there would be no ready manner by which the user could bypass the system to connect power directly.

Also, Pickard implements the relay disconnect/reconnect operations by immediately disconnecting power when a high or low voltage fault is detected and then initiating a delay once the voltage returns to acceptable levels. This means that the voltage must remain in the acceptable level for the entire delay period for power to be reconnected. The major flaw in this implementation is the lack of a delay before disconnecting power at a low voltage fault. The cycling up of an air conditioner, for example, can cause a momentary drop in the monitored line voltage while the compressor motor starts. If power is immediately disconnected the air conditioner will never come up to speed and will be forced to restart when power is restored causing another momentary low voltage fault and immediate disconnection. This cycle can potentially last indefinitely.

Lastly, many mobile AC loads including RVs, use alternative power sources which include battery driven power inverters, and generators which can generate non-sinusoidal waveforms. Pickard uses small filtering capacitor values in the AC voltage monitoring power supplies allowing for quick changes in the DC monitor voltages applied to the window comparator. These small filtering capacitors, however, prevent the system from operating with non-sinusoidal wave forms because when the line voltage waveform changes, the average value of the DC monitored voltage also changes. This would result in Pickard's system failing to operate consistently with non-sinusoidal power sources.

Another system is disclosed in U.S. Pat. No. 5,319,514, issued on Jun. 7, 1994 to Walsh et al. Walsh et al. discloses a digital voltage protection circuit and a phase monitor circuit that connects power to AC powered user equipment whenever the voltage is within a predetermined window. Walsh et al.'s phase monitor circuit is configured to monitor three-phase AC power lines and would be useless in the single-phase environment of RVs and other mobile electrical systems. Walsh et al. also uses the monitored AC power line to power the reference voltage circuits, the electronic components and the normally open AC relay used to connect power to the load.

Walsh et al. also suffers from the problems of disconnect/reconnect implementation and small filtering capacitors as discussed with Pickard ('730). Walsh et al. also disconnects power immediately and uses a delay once acceptable voltage levels are detected. Lack of a delay before disconnecting due to a low voltage condition will present the same problems outlined above. Also, for the same reasons as Pickard, Walsh is incompatible with non-sinusoidal sources.

SUMMARY OF THE INVENTION

According to one aspect of the present invention, a control circuit is provided to automatically and continuously monitor the wiring polarization and power source voltage(s). A circuit is also provided to disconnect an RV or other mobile electrical power load from the AC power source when a fault condition is detected and to reconnect the power source when the fault condition has been removed.

In addition to monitoring the source voltage(s) to proper levels, the invention also continuously monitors the polarization of the incoming power source conductors to ensure proper wiring configuration. A polarization error is detected if the conductors of the AC power source are misconnected to the conductors of the AC load, for example if the "hot" line of the power source were connected to ground of the load. A polarization error is also detected and a fault condition generated if one or more of the conductors of the AC power source is not connected at all. The invention is able to act on a detected fault condition and completely disconnect the power source from the RV by activating a normally closed DC relay. The invention will also restore power after a minimum delay time when the voltage(s) is within the operating window or the wiring polarization error is resolved.

The system, in one aspect of the invention, including all of the control circuitry and the disconnection DC relay(s), is powered by a DC power source completely independent of the monitored AC power source. The independent DC power source ensures the stability of the reference voltages that define the window of acceptable power source voltage. The independent DC source also allows the invention to operate when the AC source voltage falls below the minimum voltage required to operate the prior art systems, and allows the relay to keep power disconnected at dangerously low AC source voltage levels.

Customarily, the main disadvantage of operating a power management system with an independent control power source is the requirement to provide a power supply whose operation and performance are truly independent of the a-c system being monitored. In the RV, houseboat and other similar mobile system environments, this disadvantage is moot since these vehicles are outfitted with large batteries, that are kept charged by engine-driven alternators or battery chargers, to run appliances when the system is away from an external AC power source. The invention's current drain on such a continuously recharged battery is minimal even when the system is locking power out and is drawing maximum current.

In another aspect of the invention the system, unlike the prior art, uses a normally closed relay to disconnect power from the system when a fault condition is detected. This feature allows the system to be hard wired into the RV's electrical system ensuring convenient access to system controls by the user. A system using normally open relays to connect power does not lend itself to being hard wired to the load because, in the case of a malfunction in the monitoring system, there would be no way to connect power to the RV. In the invention, using normally closed relays means that in the case of a malfunction the relays remain closed and power is still available to the RV. This configuration also allows the invention to provide an on/off switch permitting the user to bypass the monitoring system if he desires.

Another aspect of the invention relates to the implementation of the disconnect/reconnect operation. While the system immediately acts to disconnect power from the system when one or more AC source voltages exceed the upper limit, the system has a short delay incorporated at the lower source voltage limit. This low delay timer is required to provide appliances requiring large starting currents a time interval of about three seconds to start and reach steady-state operating conditions. In the absence of this delay, the temporary decrease in source voltage caused by the large starting current would cause an immediate power disconnection for a prescribed period of time, to be discussed below. As soon as power became disconnected from the load, the source voltage would return to an acceptable value and power would be reconnected. The appliance would again attempt to start, the source voltage would drop, and the cycle would repeat endlessly. None of the prior art systems recognize this problem or provide this unique solution.

In another aspect of the invention concerning detection of polarization errors, the system can be modified to add the capability by means of additional normally closed relay contacts controlled by circuits already present in the invention to open the AC source neutral and ground conductors as well as the power conductors upon detection of a polarization error or of a voltage fault condition. This action would completely disconnect the load from the AC power source thereby removing any possibility of electric shock.

Additionally, in another aspect of the invention, the system has been specifically designed to operate both with sinusoidal AC power sources and with non-sinusoidal sources such as power inverters and generators.

While the system has been designed for the needs of mobile AC loads, one skilled in the art will recognize that the system is easily and immediately adaptable to fixed AC loads with all the advantages discussed above.

The invention may be implemented in either of two versions, as required by the configuration of the AC power system being monitored: 120-volt, 30-amp, 3-wire service or 120/240-volt, 150-amp, 4-wire service.

BRIEF DESCRIPTION OF THE DRAWINGS

Other objects and features of the invention will become more readily apparent from the following detailed description when read in conjunction with the accompanying drawings, wherein:

FIG. 15 is a schematic diagram of a circuit implementing the line two portion of the Comparator Circuit of the 50 Amp, 4 wire system;

DETAILED DESCRIPTION

External power sources for mobile AC loads are generally provided in two types. A 30 Amp system provides the mobile AC load with a three wire connection. The three wires of the 30 Amp system are the neutral, the ground, and the power line. Power is supplied at 120 volts between the power line and the neutral. The second type of power supply is a 50 Amp system which has a four wire connection including a second power line in addition to the first power line, the neutral, and the ground. Power is supplied at 120 volts between each power line and neutral and at 240 volts between the two power lines. In either service configuration, the ground wire is provided solely to ensure that the RV chassis cannot sustain any voltage with respect to earth; it does not carry any load current. The control circuit embodying the invention can be configured to accommodate either system. A control circuit for the 30 Amp system is shown in FIGS. 2 through 9, while a control circuit for the 50 Amp system is shown in FIGS. 11-17.

FUNCTIONAL OVERVIEW

Figure 1:
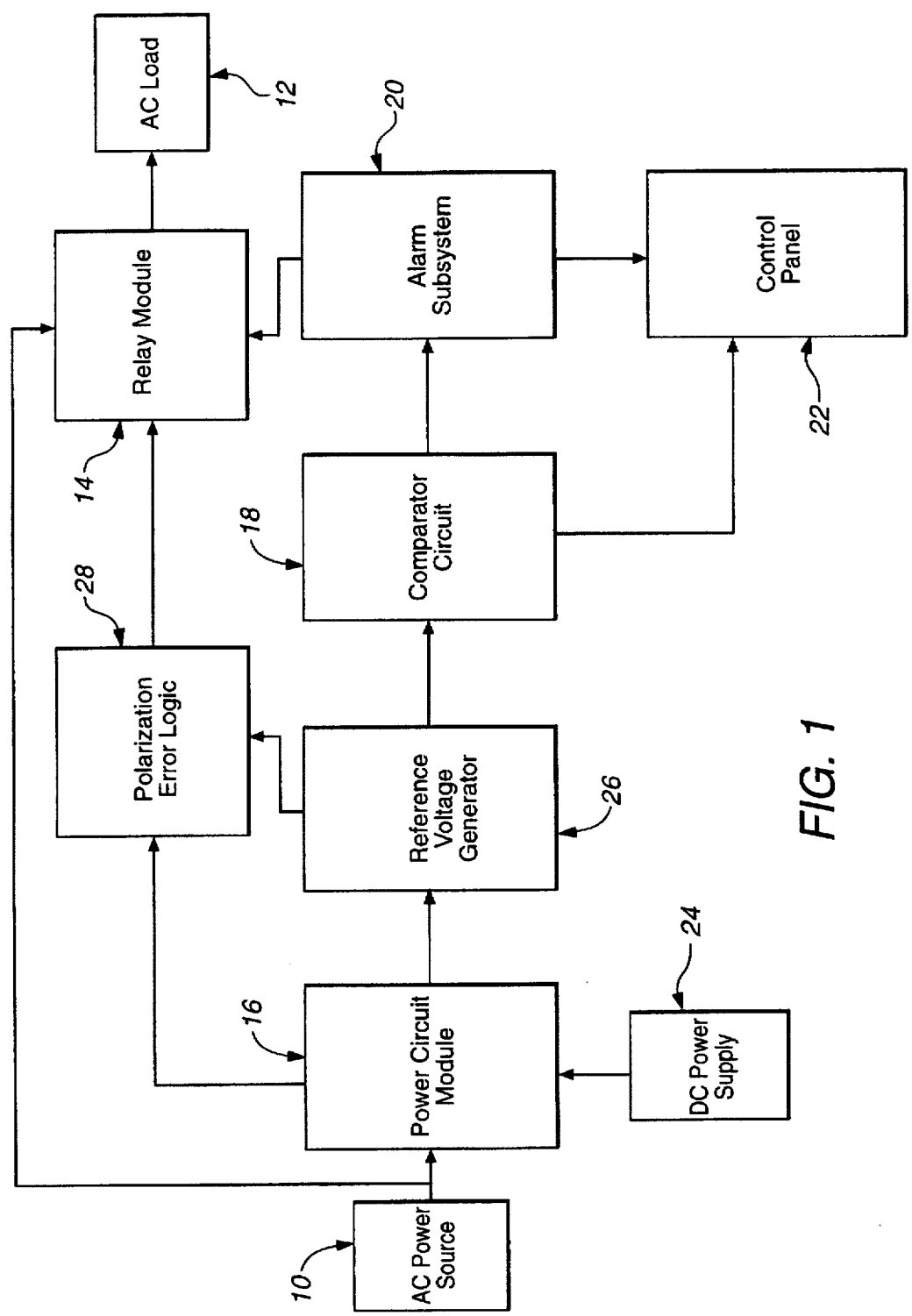
FIG. 1 is a functional block diagram of the invention.

Referring now to FIG. 1, a description of the preferred embodiment of the control circuit for the power management system representing the present invention is given. FIG. 1 is a block diagram representation of a control circuit for automatically monitoring the output voltages and wiring of power source 10 in order to protect AC load 12. Power source 10 is connected to AC load 12 through relay module 14 which provides the means for the control circuit to disconnect power source 10 from AC load 12. Power source 10 is also connected to power circuit module 16. Power circuit module 16 accepts the AC output voltage(s) from power source 10 and provides a DC signal(s) proportional to the AC output voltage(s) to reference voltage generator 26 which generates a suitable working test voltage(s) for comparator circuit module 18. Power circuit module 16 also utilizes independent DC power supply 24 to provide power to all circuits and electronic devices used in the control circuit as well as providing a stable voltage source for reference voltage generator 26 which provides the reference voltages for comparator circuit module 18. Comparator circuit module 18 receives the DC voltage(s) proportional to the AC input voltage(s) to power circuit module 16 and the reference voltages from the reference voltage generator 26. Comparator circuit module 18 monitors the AC input voltage(s) to ensure that it is within the acceptable limits defined by the reference voltages. If the AC input voltage(s) strays outside the acceptable range comparator circuit module 18 triggers alarm subsystem 20 and turns on lights in control panel 22 indicating either a high or low voltage fault. Alarm subsystem 20, when activated by comparator circuit module 18, energizes relay module 14 disconnecting power from AC load 12 and also turns on the alarm light and audible alarm in control panel 22.

In addition to comparator circuit module 18, power circuit module 16 connects also to polarization error logic 28. Polarization error logic 28 receives all power lines, neutral, and ground from power circuit module 16 and receives a reference voltage from reference voltage generator 26. Polarization error logic 28 continuously monitors the incoming fines to ensure that they are properly polarized. If a polarization error is detected polarization error logic 28 sounds an alarm located in relay module 14, turns on a light indicating a polarization error and the alarm fight and audible alarm of the control panel 20, and disconnects power source 10 from the AC load 12.

THE 30 AMP. 3 WIRE SYSTEM

Circuit Description

Figure 2:
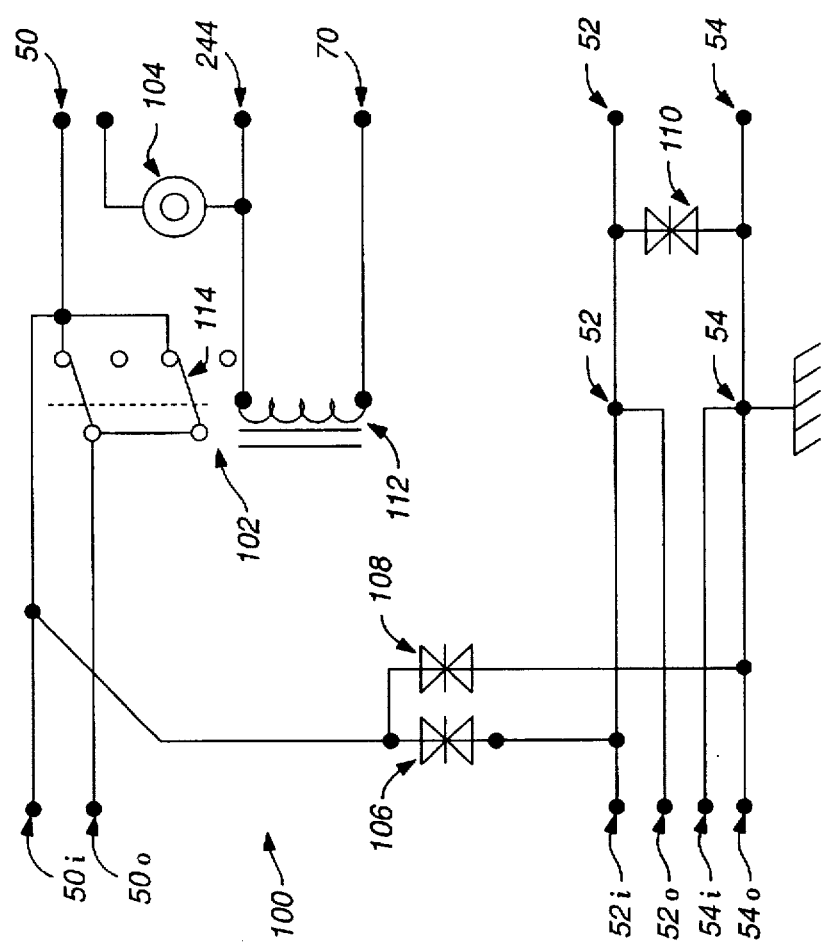
FIG. 2 is a schematic diagram of a circuit for implementing the Relay Module of the 30 Amp, 3 wire system.

Referring now to FIG. 2, a circuit for implementing the functions of relay module 14 from FIG. 1 for the 30 Amp. 3 wire system is depicted. The relay circuit 100 connects line one in 50i, neutral in 52i, and ground in 54i to the rest of the invention as line one signal 50, neutral 52 and ground 54 as well as to the mobile load as line one out 50o, neutral out 52o and ground out 54o. Relay circuit 100 consists primarily of relay 102 and surge suppressors 106, 108 and 110. Contacts 114 of relay 102 are connected between the line one in 50i and the mobile AC load through line one out 50o. Surge suppressor 106 is connected between line one in 50i and neutral 52. Surge suppressor 108 is connected between line one in 50i and ground 54, and surge suppressor 110 is connected between neutral 50 and ground 52. Relay circuit 100 also includes polarization error horn 104 which will be discussed below. Relay circuit 100, in addition to connecting the power source to the mobile AC load also connects line one signal 50, neutral 52, and ground 54 of the power source to the rest of the control circuit. Coil 112 of relay 102 is connected between DC supply 58 via fine 244 and lockout signal 70 discussed below.

Figure 3:
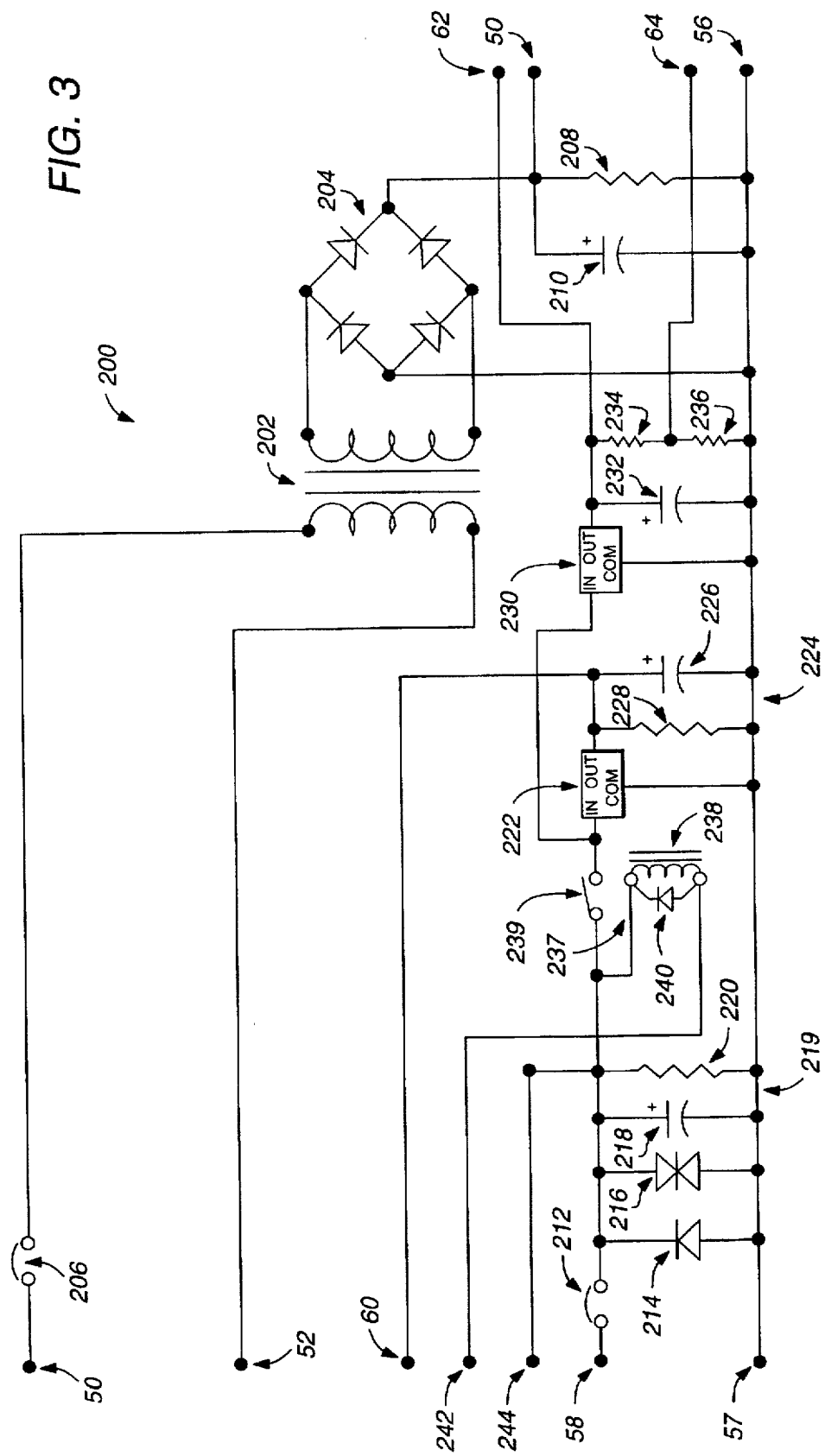
FIG. 3 is a schematic diagram of a circuit for implementing the Power Circuit Module of the 30 Amp, 3 wire system.

FIG. 3 depicts an electronic circuit for implementing the functions of power circuit module 16 from FIG. 1. The power circuit 200 connects line one signal 50 received from the relay circuit 100 of FIG. 2 to transformer 202 through circuit breaker 206. Transformer 202 connects line one signal 50 to bridge rectifier 204. Bridge rectifier 204 is connected through the filter made of resistor 208 and capacitor 210 to line one signal 50 of reference voltage generator circuit 300 shown in FIG. 4. Power circuit 200 also connects to the independent DC power supply 24 from FIG. 1 in order to provide power to the control circuit. DC power is brought in from the independent power supply via DC supply 58 and DC supply common 57 and is connected through circuit breaker 212 and across diode 214, surge protector 216, and low pass noise filter 219, comprised of resistor 220 and capacitor 218. DC supply common 57 is connected to system common 56. DC supply 58 is inputted through relay 237 to regulator 222 which provides power via system voltage 60 to the control circuit through filter 224 consisting of resistor 226 and capacitor 228. DC supply 58 also is inputted to regulator 230 which supplies reference voltage 62 to reference voltage generator circuit 300 of FIG. 4 through the filter comprised of capacitor 232 and resistors 234 and 236. Resistors 234 and 236 are a voltage divider used to provide polarization reference 64 to be discussed later.

Figure 9:
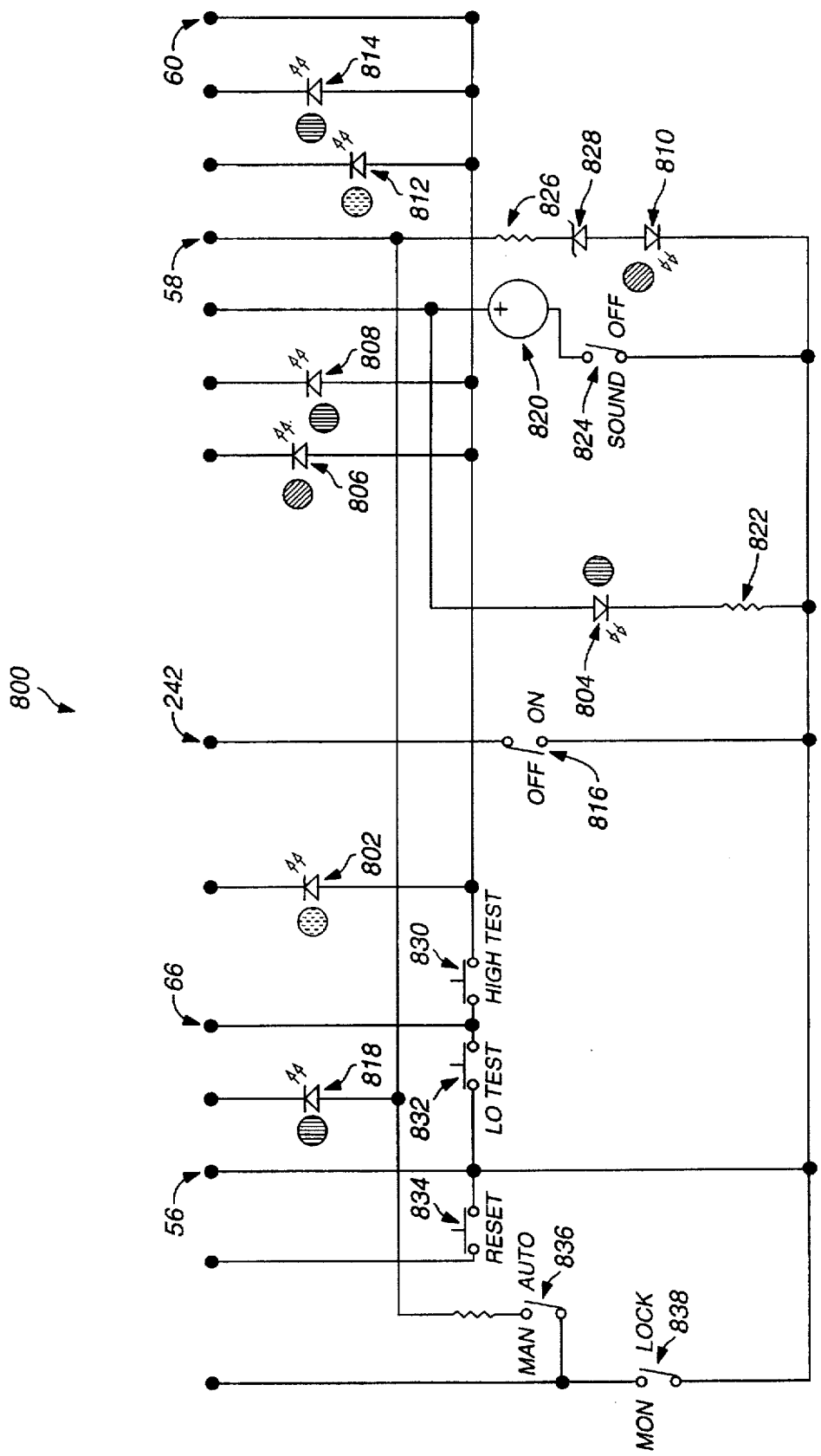
FIG. 9 is a schematic diagram of a circuit implementing the Control Panel of the 30 Amp, 3 wire system.

Relay 237 made up of relay coil 238 and relay contact 239 is connected to on/off switch 816 of FIG. 9. The connection is made across diode 240 through line 242. Line 244 connects DC supply 58 to coil 112 of relay 102.

Figure 4:
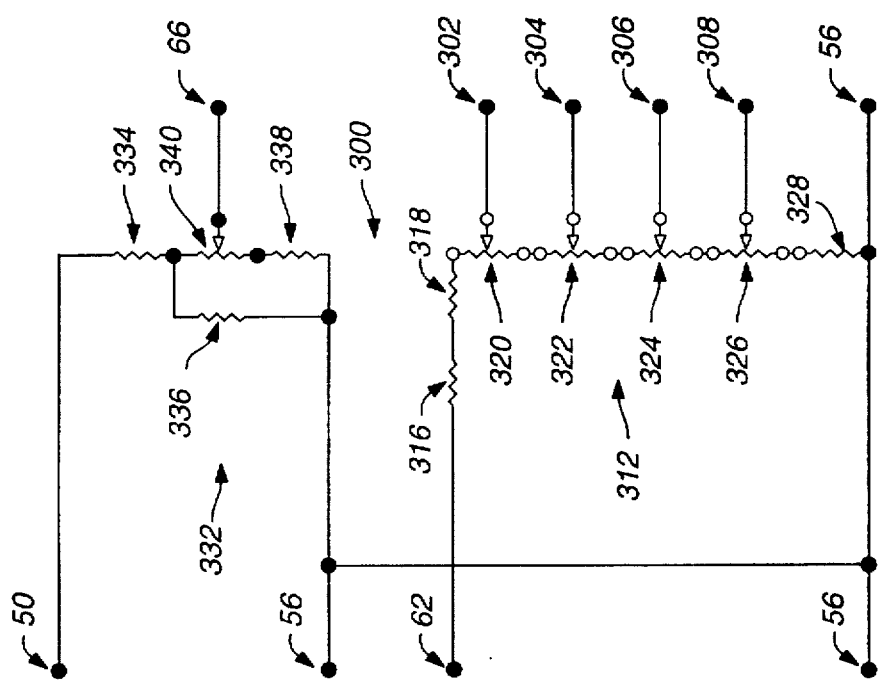
FIG. 4 is a schematic diagram of a circuit for implementing the Reference Voltage Generator of the 30 Amp, 3 wire system.

FIG. 4 depicts an electronic circuit for implementing reference voltage generator 26 from FIG. 1. Reference voltage generator circuit 300 provides DC voltages representative of four reference voltages used by comparator circuit 400 shown in FIG. 5. The four reference voltages generated by this circuit consist of a high limit voltage 302, high warning light voltage 304, low warning light voltage 306, and low limit voltage 308. The reference voltages are generated through voltage dividing circuit 312 connected across reference voltage 62 and system common 56. Voltage dividing circuit 312 receives reference voltage 62 generated by regulator 230 from FIG. 3. Voltage dividing circuit 312 is comprised of resistors 316, 318 and 328, and variable resistors 320, 322, 324 and 326 connected in series.

Figure 5:
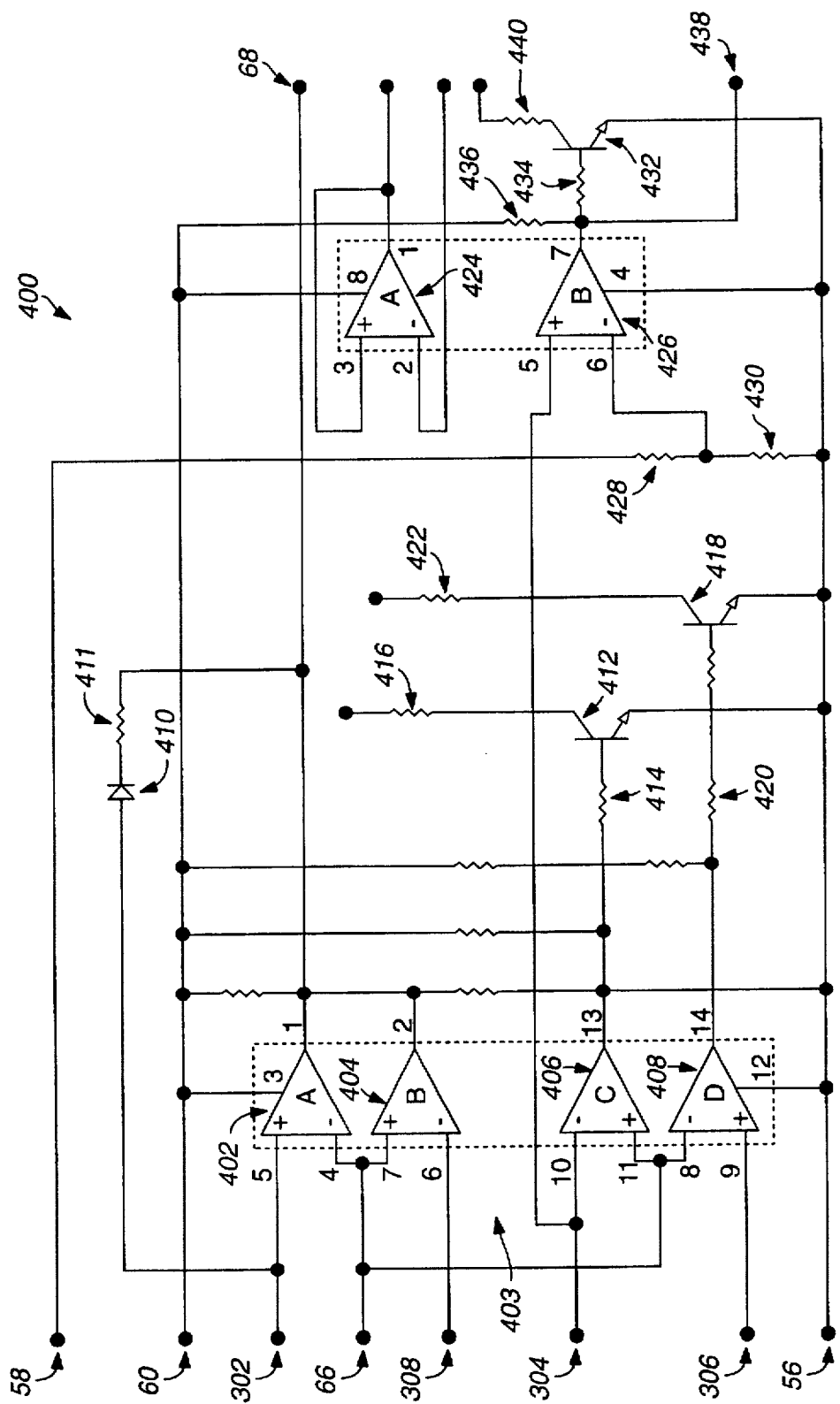
FIG. 5 is a schematic diagram of a circuit implementing the Comparator Circuit of the 30 Amp, 3 wire system.

Reference voltage generator circuit 300 also provides test voltage 66 to the comparator circuit in FIG. 5 through scaling circuit 332. Scaling circuit 332 is connected between line one signal 50 and system common 56. Scaling circuit 332 is comprised of resistors 334, 336, and 338 and variable resistor 340.

FIG. 5 depicts an electronic circuit for implementing comparator circuit module 18 from FIG. 1. Comparator circuit 400 comprises discrete 339-type comparators 402, 404, 406 and 408. Comparator 402 has its inputs connected to high limit reference voltage 302 and test voltage 66, and has its output connected to alarm trigger 68. Comparator 404 has its inputs connected to low limit reference voltage 308 and test voltage 66, and has its output connected to alarm trigger 68. Comparator 406 has its inputs connected between high warning light reference voltage 304 and test voltage 66, and has its output connected to switch transistor 412 through resistor 414. Comparator 408 has its inputs connected between low warning light reference voltage 306 and test voltage 66, and has its output connected to switch transistor 418 through resistors 420. Switch transistors 412 and 418 are connected to high AC warning light 814 and low AC warning light 802 through resistor 416 and 422, respectively, both from FIG. 9. Diode 410 and resistor 411 are connected between alarm trigger 68 and high reference voltage 302.

Comparator 426 has its inputs connected between high wanting light reference voltage and DC supply 58 through resistors 428 and 430. The output of comparator 426 is connected to switch transistor 432 through resistor 434 and to system voltage 60 through resistor 436. The collector of switch transistor 432 is connected through resistor 440 to low DC warning light 812 of FIG. 9, while the emitter is connected to system common 56. The output of comparator 426 is also connected to LowDC 438 used by the alarm circuit of FIG. 8. Comparator 424 is connected directly to alarm circuit of FIG. 8 and will be discussed below.

Figure 6:
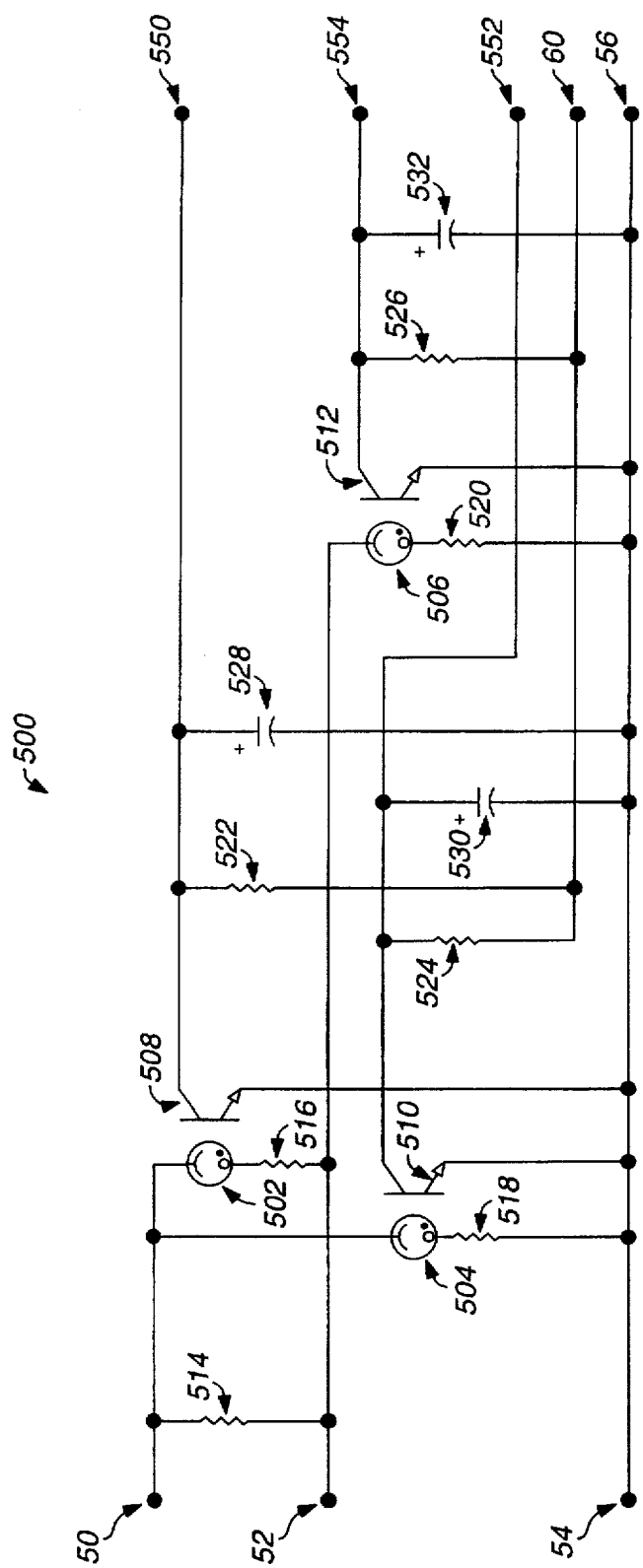
FIG. 6 is a schematic diagram of a circuit implementing a Voltage Sensing Circuit in the Polarization Error Logic of the 30 Amp, 3 wire system.
Figure 7:
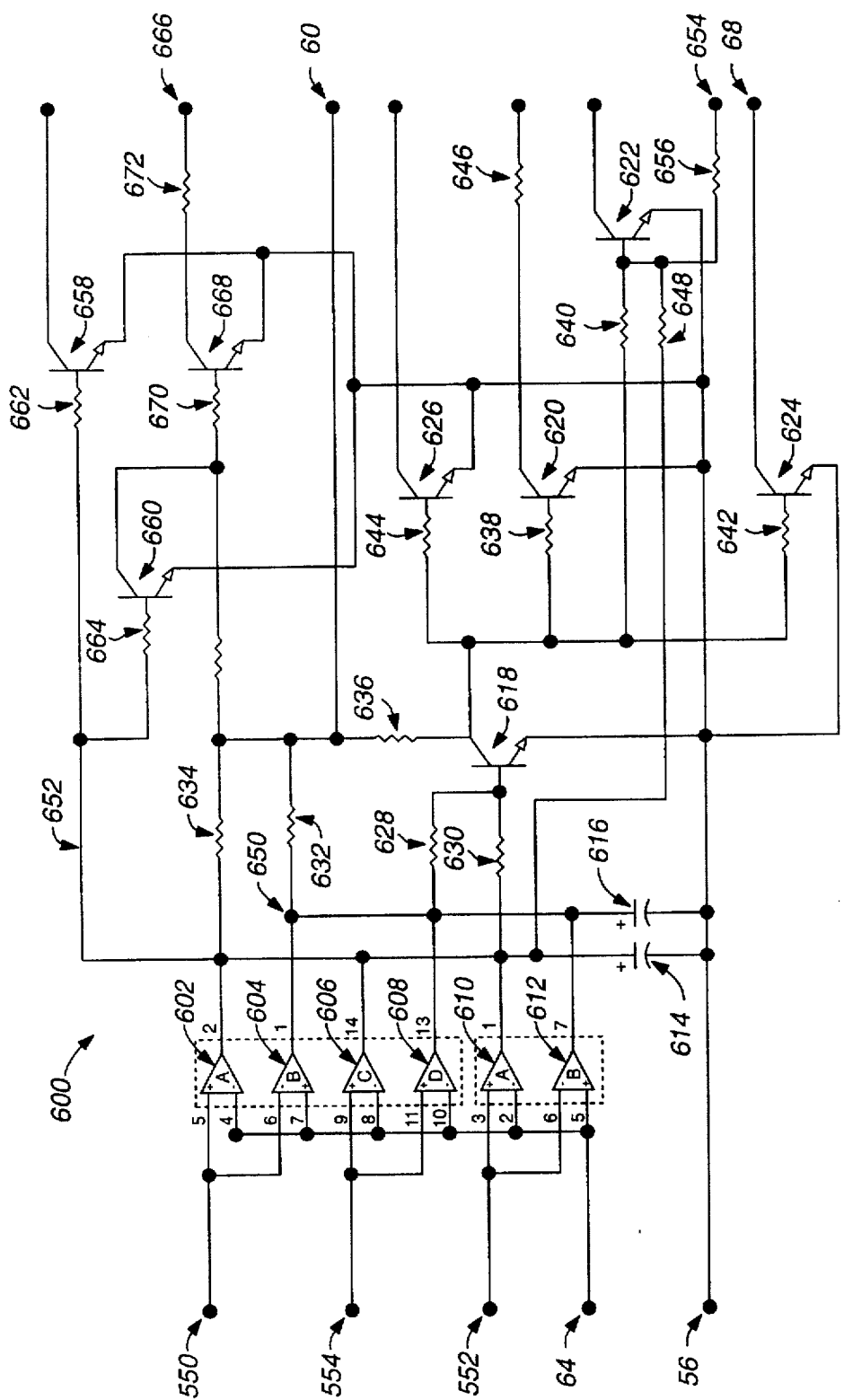
FIG. 7 is a schematic diagram of a circuit implementing a Logic Circuit in the Polarization Error Logic of the 30 Amp, 3 wire system.

FIGS. 6 and 7 depict electronic circuits for implementing polarization error logic 28 from FIG. 1. FIG. 6 depicts voltage sensing circuit 500. Voltage sensing circuit 500 consists primarily of neon bulbs 502, 504 and 506, and their associated phototransistors 508, 510 and 512. Neon bulb 502 and current limiting resistor 516 are connected, along with resistor 514, between line one signal 50 and neutral 52. Phototransistor 508 associated with neon bulb 502 provides line one/neutral voltage 550 used by polarization error logic 600 of FIG. 7. Neon bulb 504 and current limiting resistor 518 are connected between line one signal 50 and ground 54. Phototransistor 510 associated with neon bulb 504 provides line one/ground voltage 552 also used by polarization error logic 600. Neon bulb 506 and current limiting resistor 520 are connected between neutral 52 and ground 54. Phototransistor 512 associated with neon bulb 506 provides neutral/ground voltage 555 also used by polarization error logic 600. Resistors 522, 524 and 526 are connected between the photo transistors 508, 510 and 512 and system voltage 60. Filtering capacitors 528, 530 and 532 are connected between phototransistors 508, 510 and 512 and system common 56. Phototransistor emitters are all connected to system common 56.

FIG. 7 depicts polarization error logic circuit 600 which begins with comparators 602, 604, 606, 608, 610 and 612. Comparators 602 and 604 have their inputs connected to line one/neutral 550 and polarization reference voltage 64 from FIG. 4. Comparators 606 and 608 have their inputs connected to line one/ground 552 and polarization reference voltage 64. Comparators 610 and 612 have their inputs connected to neutral/ground 554 and polarization reference voltage 64. Comparators 604, 608 and 612 then have their outputs connected to normal power signal 650 while comparators 602, 606 and 610 connect their outputs to no power signal 652. Capacitors 614 and 616 are connected between no power 652 and system common 56 and normal power 650 and system common 56, respectively.

Both normal power 650 and no power 652 are connected to the base of transistor 618 through resistors 628 and 630, respectively. Normal power 650 and no power 652 are also connected to system voltage 60 through pull-up resistors 632 and 634. The collector of transistor 618 is connected to system voltage 60 through pull-up resistor 636 and is also connected to transistors 620, 622, 624 and 626 through resistors 638, 640, 642 and 644, respectively. Transistor 620 collector is connected to polarization error light 808 of FIG. 9 through resistor 646. Transistor 622 has three potential inputs connected to its base which include transistor 618 through resistor 640, no power 652 through resistor 648, and line 654 through resistor 656 from the alarm circuit in FIG. 8. Transistor 622 has its output connected to low delay timer 708 shown in FIG. 8. Transistor 624 is connected to alarm trigger 68. Transistor 626 is connected to horn 104 in FIG. 2.

Additionally, no power 652 is connected to transistors 658 and 660 through resistors 662 and 664. Transistor 658 has its output connected to light and beeper generator 704 of FIG. 8 through line 666. Transistor 660 is connected to transistor 668 through resistor 670. Transistor 668 connects to power light 806 in the control panel of FIG. 9 through resistor 672.

Figure 8:
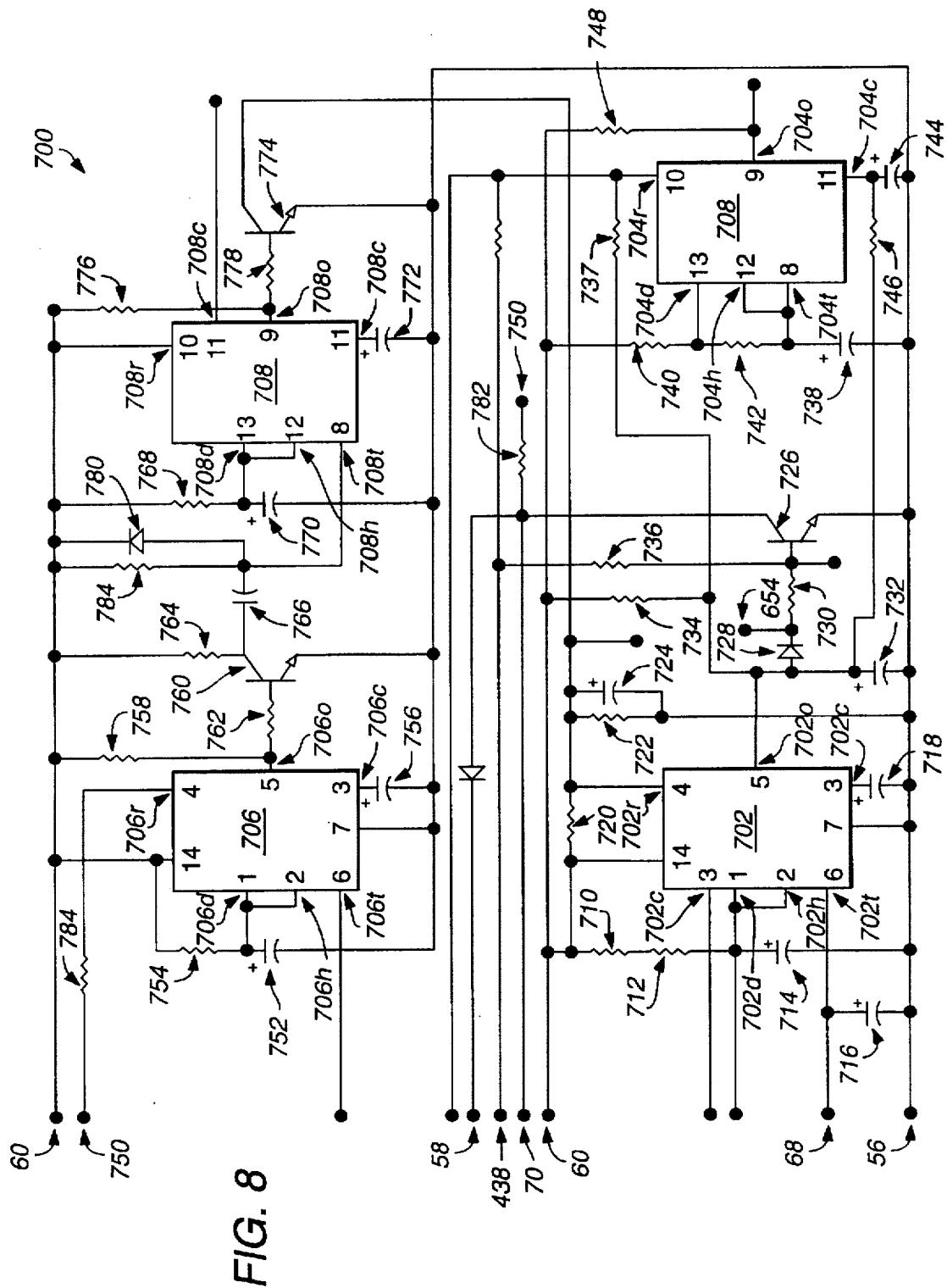
FIG. 8 is a schematic diagram of a circuit implementing the Alarm Subsystem of the 30 Amp, 3 wire system.

FIG. 8 is a depiction of an electronic circuit implementing alarm subsystem 20 of FIG. 1. Alarm subsystem circuit 700 is comprised of four 555-type timers as are well known in the art. Timing cycle generator 702 is connected via its trigger 702t to alarm trigger 68. Threshold 702h and discharge 702d of timer 702 are connected to one input of comparator 424 from FIG. 5 and control voltage 702c is connected to the second input of comparator 424. Resistors 710 and 712 connect system voltage 60 to discharge 702d and threshold 702h which are connected to system common 56 through capacitor 714. Filter capacitor 716 is connected between trigger 702t and system common 56. Control voltage 702c is connected to system common 56 through capacitor 718. Reset 702r is connected to system voltage 60 through resistor 720. Resistor 722 and capacitor 724 are connected between resistor 720 and system common 56.

Output 702o is connected to the base of transistor 726 through diode 728 and resistor 730. Output 702o is connected to system common 56 through capacitor 732 and pulled high through resistor 734. Output 702o also connects to the base of transistor 622 of FIG. 7 via diode 728 and line 654 and to reset 704r through resistor 737. Transistor 726 has its collector connected to lockout signal 70. Transistor 726 is also connected to lock out light 818 in FIG. 9 through resistor 782.

Light and beeper generator 704 has its trigger 704t and threshold 704h connected to system common 56 through capacitor 738 and to system voltage 60 through resistors 740 and 742. Discharge 704d is connected to both resistors 740 and 742. Control voltage 704c is connected to system common 56 through capacitor 744 and is connected to timing cycle generator 702 output 702o through resistor 746. Output is 704o pulled high through resistor 748 and connected to alarm speaker 820 and alarm light 804 in FIG. 9.

Low delay trigger 706 has its trigger 706t connected to alarm trigger 68. Reset 706r is connected to the output of comparator 408 from FIG. 5 via line 750 and through resistor 784. Capacitor 752 is connected between system common 56 and threshold 706h and discharge 706d which are also connected to system voltage 60 through resistor 754. Control voltage 706c is connected to system common 56 through capacitor 756. Output 706o is pulled high by resistor 758 and is connected to transistor 760 through resistor 762. Transistor 760 has its collector pulled high by resistor 764 and is connected to trigger 708t of low delay timer 708 through capacitor 766.

Threshold 708h and discharge 708d of low delay timer 708 are connected to system voltage 60 through resistor 768 and to system common 56 through capacitor 770. Trigger 708t of low delay timer 708 is connected to system voltage 60 through diode 780 and resistor 784 in parallel. Reset 708r is tied directly to system voltage 60 while control voltage 708c is connected to ground through capacitor 772. Control voltage 708c is also connected to transistor 622 in FIG. 7. Output 708o is pulled high by resistor 776 and connected to transistor 774 through resistor 778. Collector of transistor 774 is connected to reset 702r of timing cycle generator 702.

FIG. 9 is a depiction of a circuit implementing the control panel 22 of FIG. 1. Circuit 800 contains LEDs 802, 804, 806, 808, 810, 812, 814 and 818. Low AC LED 802 is connected to switch transistor 418 through resistor 422 from FIG. 5. High AC LED 814 is connected to switch transistor 412 through resistor 416, also from FIG. 5. Alarm LED 804 in series with resistor 822 is connected in parallel with alarm speaker 820 to output 704o of light and beeper generator 704 from FIG. 8. Sound switch 824 is connected between alarm speaker 820 and system common 56. Power light 806 is connected to the output of switch transistor 668 through resistor 672 both of FIG. 7. Polarization error light 808 is connected to the output of switch transistor 620 through resistor 646 both of FIG. 7. DC power light 810 is connected to DC supply 58 through resistor 826 and zener diode 828. Low DC power light 812 is connected to the output of switch transistor 432 through resistor 440 from FIG. 5.

On/off switch 816 is connected via line 242 to relay 237 of FIG. 3. High-test switch 830 is connected between test voltage 66 and system voltage 60. Low-test switch 832 is connected between test voltage 66 and system common 56. Reset switch 834 is connected between reset 702r of timing cycle generator 702 of FIG. 8 and system common 56. Manual lock switch 836 is between DC supply 58 and the base of transistor 726 of FIG. 8, and monitor switch 838 is connected between system common 56 and the base of transistor 726 from FIG. 8.

Figure 10:
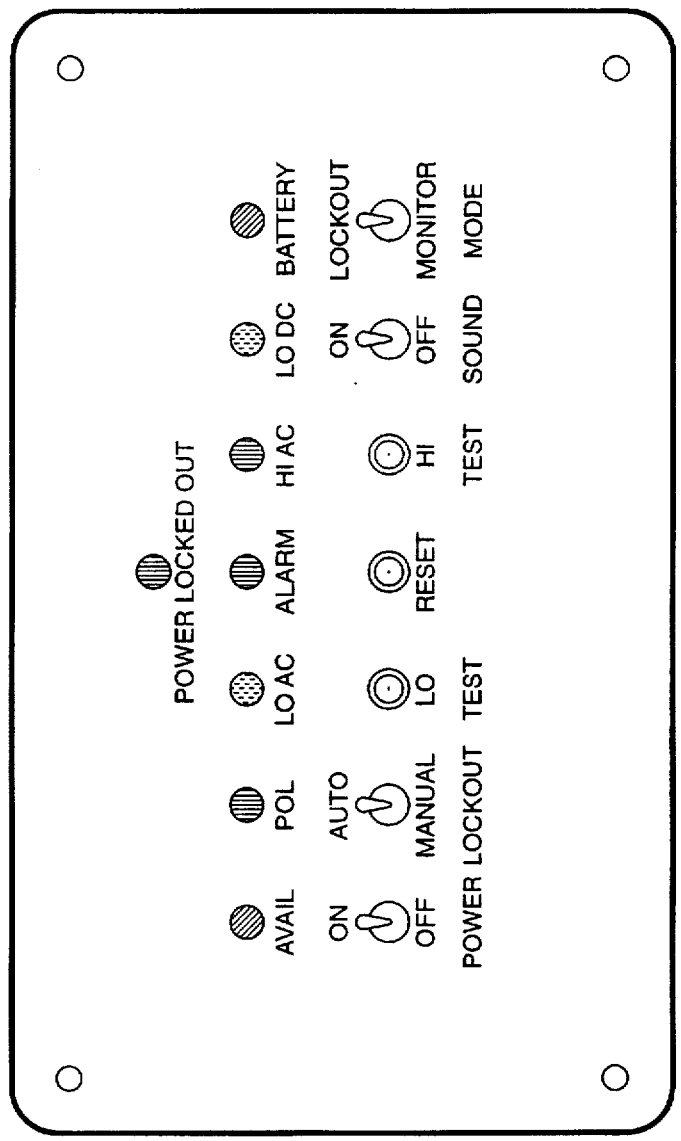
FIG. 10 is a frontal view of the Control Panel of the 30 Amp, 3 wire system and the 50 Amp, 4 wire system.

FIG. 10 is a depiction of an embodiment of the user interface for control panel 22 of FIG. 1. FIG. 10 shows a possible layout of the lights and switches described in FIG. 9.

Operation

Referring again to FIGS. 2–10 the operation of the preferred embodiment of the 30 Amp system will be described. Since the invention is powered by an independent power supply and not the monitored AC power source, the invention will already be powered up and in a steady state whenever an AC power source is connected instead of having to power up after connection like the prior art systems. The system, therefore, will be discussed in its steady state operation.

In steady state operation the independent DC power supply supplies DC supply voltage 58 to power circuit 200 of FIG. 3. System common 56 is also provided by the independent power supply which has its negative pole wired to the ground of the mobile load. DC Supply 58 is fed to the system and through regulators 222 and 230. Regulator 222 provides system power 60 to the system while regulator 230 supplies reference voltage 62 and polarization reference 64. Reference voltage 62 is used by voltage divider 312 of FIG. 4 to generate the reference voltages used by comparator circuit 400 of FIG. 5. Polarization reference 64 is used by polarization error logic circuit 600 of FIG. 7.

When a properly polarized AC power source having acceptable voltages is connected to the invention, relay circuit 100 of FIG. 1 remains deenergized and thereby connects power to the mobile load through its normally closed contacts. Line one signal 50 is passed through transformer 202 and bridge rectifier 204. Transformer 202 is very lightly loaded so that any changes in the line-to-neutral voltage will produce corresponding changes in the voltage seen by bridge rectifier 204. Line one signal 50 outputted by bridge rectifier is a DC voltage whose level corresponds to the AC line-to-neutral voltage of the AC power source. Line one signal 50 is converted into test voltage 66 by scaling circuit 332 of FIG. 4.

Test voltage 66 is sent to comparator circuit 400 of FIG. 5 where it is compared to the reference voltages. Comparators 406 and 408 form a window comparator with high warning light voltage 304 and low warning light voltage 306 as the boundaries. Using a system voltage of six volts results in high warning light voltage being approximately 2.65 volts and low warning light voltage being approximately 2.35 volts which correspond approximately to line voltages of 126 volts and 114 volts respectively. Test voltage 66 is set to a nominal 2.5 volts when the monitored voltage is 120 volts. If test voltage 66 strays above high warning light voltage 304 or below low warning light voltage 306, comparator 406 or comparator 408 is turned on, respectively. Comparator 406, when on, turns switch transistor 412 on which lights high AC warning light 814 in FIG. 9. Comparator 408, when on, turns on switch transistor 418 which lights low AC warning light 802 in FIG. 9 and additionally enables low delay trigger 706.

Comparators 402 and 404 form a window comparator with high limit voltage 302 and low limit voltage 308 as the boundaries. Using a system voltage of six volts results in high limit voltage 302 being approximately 2.85 volts and low limit voltage 308 being approximately 2.15 volts which correspond approximately to line voltages of 135 volts and 105 volts respectively. If test voltage 66 rises above high limit voltage 302 or falls below low limit voltage 308, alarm trigger 68 is forced low activating timing cycle generator 702 which turns on switch transistor 726 and activates relay 102 in FIG. 2 and disconnects AC power from the mobile load.

In the case of test voltage 66 falling below low limit voltage 308, the low delay trigger 706 is activated by alarm trigger 68, having been enabled by comparator 408 when test voltage 66 fell below low light warning voltage 306. Low delay trigger 706 triggers low delay timer 708. Low delay timer 708 acts to disable timing cycle generator 702 for a short period which could be about three seconds. If the low voltage condition lasts for the entire cycle of low delay timer 708, timing cycle generator 702 is reenabled and power is locked out as will be described. If the low voltage condition lasts for less than one timing period of low delay timer 708, alarm trigger 68 is removed before timing cycle generator 702 is reenabled thereby preventing a lockout from occurring.

Timing cycle generator 702 when triggered by alarm trigger 68 and not disabled by low delay timer 708 turns on transistor 726 which causes a lockout of power by activating the disconnection relay. Output 702o of timing cycle generator 702 remains high for a period determined by the time constants formed by resistors 710 and 712 and capacitor 714. The delay period can be about one minute. Timing cycle generator 702 when active enables light and beeper generator 704 which causes alarm light 804 to flash and alarm speaker 820 to beep at a rate determined by the time constants formed by resistors 740 and 742 and capacitor 738. Additionally, when transistor 726 is turned on it turns on locked out light 818 in FIG. 9.

When test voltage 66 rises above high limit voltage 302, diode 410 is brought into play. When an alarm condition exists alarm trigger 68 falls to near ground, forward biasing diode 410. Forward biasing diode 410 causes high limit voltage 302 to drop slightly. This slight drop in high limit voltage 302 means that test voltage 66 must drop lower than the original high limit voltage 302 to deactivate alarm trigger 68. As soon as alarm trigger 68 is deactivated high limit voltage 302 rises back to its original level, thereby back-biasing diode 410 and restoring the original high limit voltage 302. Diode 410, therefore, prevents relay chatter when test voltage 66 hovers erratically around the high limit. This feature is unnecessary at the low limit due to low delay timer 708.

When no AC power is applied to the system the voltage comparator circuit described above generates alarm trigger 68 due to test voltage 66 being below low voltage limit 308. Since this no power situation occurs each time the RV power cable is disconnected or its generator or inverter system is turned off, the alarm function is modified to prevent alarm speaker 820 and alarm light 804 from being activated even though relay 102 is activated to disconnect contacts 114. This no power condition will be discussed below in relation to the polarization monitoring function.

In addition to the voltage monitoring performed by comparator circuit 400 of FIG. 5, the invention continuously monitors the polarization of the wiring from the AC power source. Polarization monitoring begins with voltage sensing circuit 500 in FIG. 6. In a 30 Amp, 3 wire system, three different AC power source voltages are presented to the system: line one-to-neutral, line one-to-ground, and neutral-to-ground. In the 30 Amp system the presence of all three voltages is detected by a voltage sensing circuit comprising neon bulb/phototransistor combinations. Corresponding signal voltages are then sent to polarization error logic circuit 600 from FIG. 7. Polarization error logic circuit 600 is wired to detect two different conditions: no power 652, and normal power 650, all other conditions being interpreted as a polarization error.

The no power situation will be considered first. When no AC power source is connected to the system the neon bulbs 502, 504 and 506 of voltage sensing circuit shown in FIG. 6 see no voltage across them and are therefore not lit. With the neon bulbs 502, 504 and 506 not lit the phototransistors 508, 510 and 512 are not on and their collectors are pulled to system voltage 60 and the signals line one/neutral 550, line one/ground 552 and neutral/ground 554 are all near system voltage 60 resulting in comparators 602, 606 and 610 in FIG. 7 having high outputs. Comparators 602, 606 and 610 all having high outputs generates no power signal 652.

No power signal 652 near system voltage 60 keeps transistor 618 on which keeps the polarization alarm function turned off. No power signal 652 near system voltage 60 turns on switch transistor 658 pulling reset 704r of light and beeper generator 704 of FIG. 8 low thereby inhibiting the alarm light 804 and alarm speaker 820 of FIG. 9. No power 652 also turns on switch transistor 660 which then turns off switch transistor 668 thereby turning power light 806 off. Additionally, no power 652 turns on switch transistor 622 which disables low delay timer 708 of FIG. 8. Therefore, even though a low voltage condition exists and relay 102 is locking out power, the user does not see or hear any of the alarm indicators.

When a normally polarized AC power line is connected to the system, neon bulbs 502 and 504 are across the AC voltages between line one signal 50 and neutral 52 and line one signal 50 and ground 54, respectively. The voltage seen by neon bulbs 502 and 504 causes them to light and activate corresponding phototransistors 508 and 510 bringing their collectors near ground which results in outputs line one/neutral 550 and line one/ground 552 being near ground. Neon bulb 506, however, sees no voltage when the AC power source is properly polarized causing phototransistor 512 to remain off, its collector pulled to system high 60, resulting in output neutral/ground being near system voltage 60. When line one/neutral 550 and line one ground 552 are near ground and neutral/ground 554 is near system voltage 60, comparators 604, 608 and 612 all have outputs near system high 60, resulting in normal power 650 being near system voltage 60. Normal power 650 near system voltage 60 keeps switch transistor 618 turned on which keeps the polarization alarm functions turned off.

When line one/neutral 550, line one/ground 552 and neutral/ground 554 are not present at comparators 602, 604, 606, 608, 610 and 612 in either of the two combinations discussed above, no power 652 and normal power 650 are both near ground. Without no power 652 or normal power 650 near system voltage 60 the base of transistor 618 falls near ground turning transistor 618 off. When transistor 618 is off the bases of transistors 620, 622, 624 and 626 all rise toward system voltage 60 turning on transistors 620, 622, 624 and 626.

Turning on transistor 620 turns on polarization error light 808 in FIG. 9. Turning on transistor 622 inhibits low delay timer 708. Even though transistor 618 allows transistor 622 to be turned on, either no power signal 652 or timing cycle generator 702 being active will turn on transistor 622 and disable low delay timer 708. Turning transistor 624 on activates alarm trigger 68 starting timing cycle generator 702. Turning on transistor 626 activates horn 104 indicating a polarization error.

The system also monitors the independent DC power supply to ensure that the system has enough voltage to operate correctly. If the independent DC power supply output voltage falls below a minimum level the system warns the user and initiates an immediate power lockout to the load. Comparator 426 in FIG. 5 is connected to DC supply 58 scaled by resistors 428 and 430 and to high warning light voltage 304. High warning light voltage 304 is used as a reference voltage simply for convenience as DC supply 58 is scaled to accommodate the reference voltage selected. When the scaled DC supply 58 falls below the critical level set by high warning light voltage 304, comparator 20 426 turns on transistor 432 which in turn lights Low DC power light 812 of FIG. 9. Comparator 426 being on also turns on transistor 726 through LowDC 438 to activate the disconnection relay and remove power from the load. Power remains disconnected until the DC supply 58 voltage decays so low that the disconnection relay can no longer remain activated.

Control panel circuit 800 of FIG. 9, in addition to the indicator lights and alarm speaker, has various switches allowing the user to control the system. On/off switch 816 is connected to relay 237 in FIG. 3. In the on position on/off switch 816 allows DC supply 58 to be connected through relay 237 to regulators 222 and 230 which supply power to the system, and in the off position on/off switch 816 disconnects regulators 222 and 230 from DC supply 58 disconnecting power from the system.

Sound switch 824 is connected in series with alarm speaker 820 and when off is open, disabling alarm speaker 820. High-test switch 830 creates a false high voltage condition by connecting test voltage 66 to system voltage 60, and similarly low-test switch 832 creates a false low voltage condition by connecting test voltage to system common 56. Reset switch 834 when pressed grounds reset terminal 702r of timing cycle generator 702 which halts the timing cycle and allows power to be reconnected, provided that alarm trigger 68 is not low because of a detected fault. Manual lock switch 836 allows the system to work normally when in the auto position. If placed in manual, manual lock switch 836 connects the base of transistor 726 of FIG. 8 to DC source 58 activating relay 102. Conversely, monitor switch 838 when closed grounds the base of transistor 726 preventing relay 102 from being activated though allowing other alarm functions to operate.

THE 50 AMP, 5 WIRE SYSTEM

Circuit Description

FIGS. 11 through 18 are depictions of the circuits implementing the preferred embodiment of the 50 Amp, 4 wire system representing the invention. The 50 Amp, 4 wire system adds a second power line, line two signal 1050, to the power monitoring system. The same circuits used in the 30 Amp, 3 wire system are used in the 50 Amp system with components added to accommodate line two signal 1050. Components in the 50 Amp system corresponding directly to components in the 30 Amp system are denoted in FIGS. 11 through 18 with a prime, for example relay 102'. Changes in the system will be discussed below.

Figure 11:
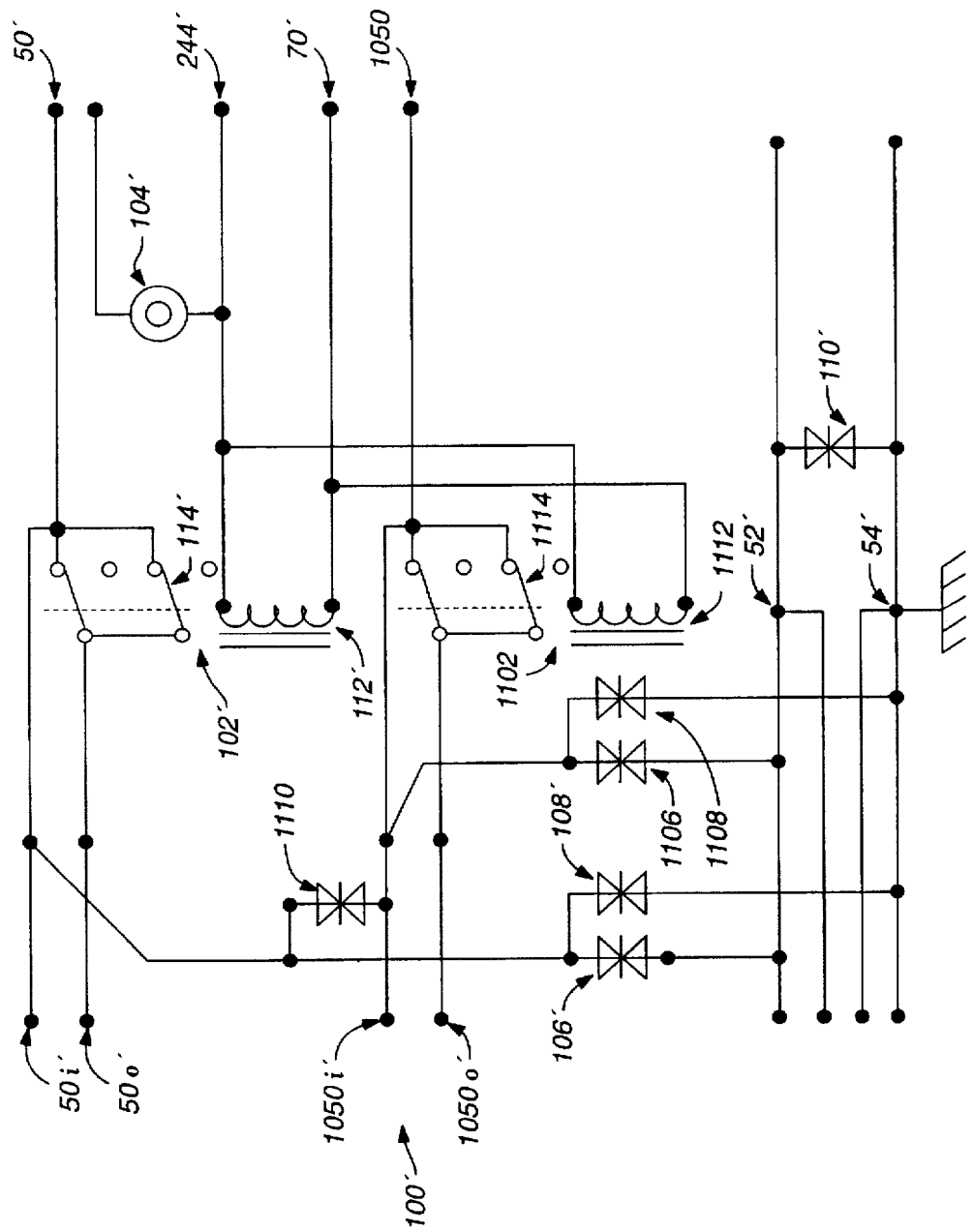
FIG. 11 is a schematic diagram of a circuit for implementing the Relay Module of the 50 Amp, 4 wire system.

FIG. 11 represents relay circuit 100' implementing the functions of relay module 14 from FIG. 1 for a 50 Amp system. Relay 1102 has been added along with surge suppressors 1106, 1108 and 1110 to accommodate line two signal 1050.

Figure 12:
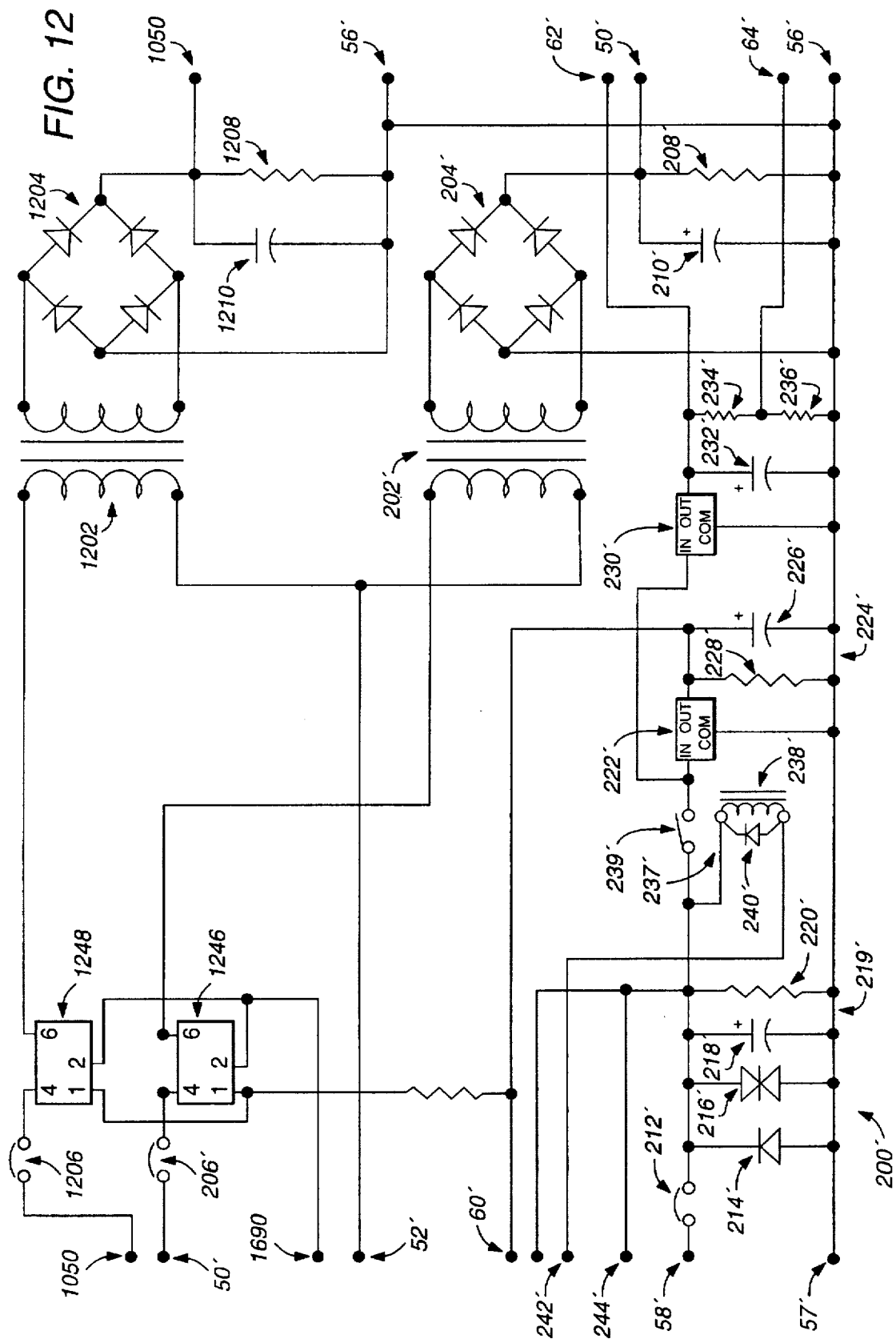
FIG. 12 is a schematic diagram of a circuit for implementing the Power Circuit Module of the 50 Amp, 4 wire system.

FIG. 12 represents power circuit 200' implementing the functions of power module 14 from FIG. 1 for a 50 Amp system. Circuit breaker 1206, transformer 1202 and bridge rectifier 1204 have been added to accommodate line two signal 1050. Additionally, opto-couplers 1246 and 1248 serving as a-c switches have been added to protect the system. Opto-coupler 1246 is connected between circuit breaker 206' and transformer 202', and opto-coupler 1248 is connected between circuit breaker 1206 and transformer 1202. Both opto-coupler 1246 and 1248 are activated by switch transistor 1782 from FIG. 17 which is turned on by normal power 350'. Opto-couplers 1246 and 1248 prevent line one signal 50' and line two signal 1050 from being connected to transformers 202' and 1202 when anything other than normal polarization is present.

Figure 13:
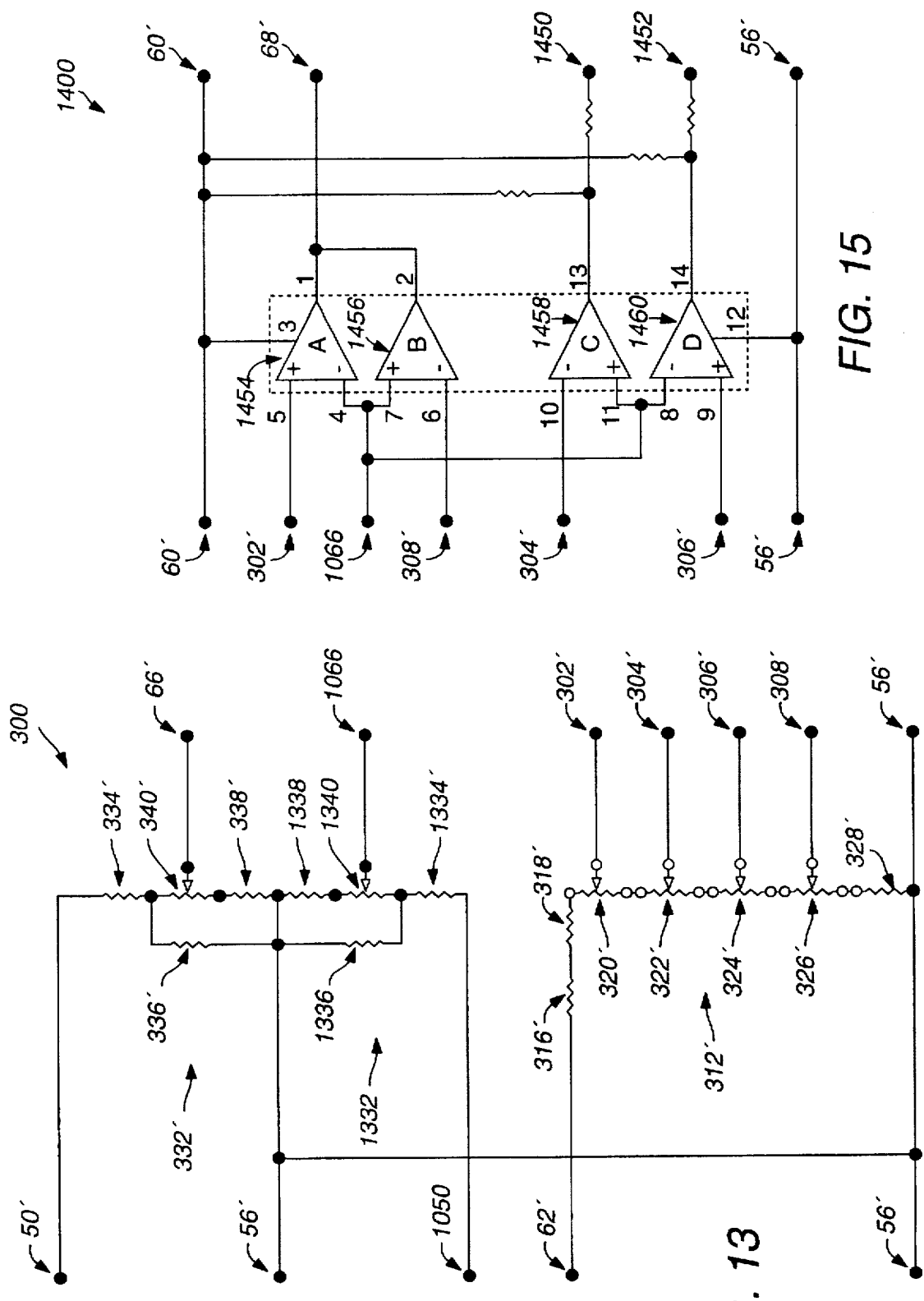
FIG. 13 is a schematic diagram of a circuit for implementing the Reference Voltage Generator of the 50 Amp, 4 wire system.

FIG. 13 represents reference voltage generator 300' implementing the functions of reference voltage generator 26 from FIG. 1 for a 50 Amp system. Scaling circuit 1332 comprised of resistors 1334, 1336, and 1338 and variable resistor 1340 has been added to accommodate line two signal 1050 by generating test voltage 1066.

Figure 14:
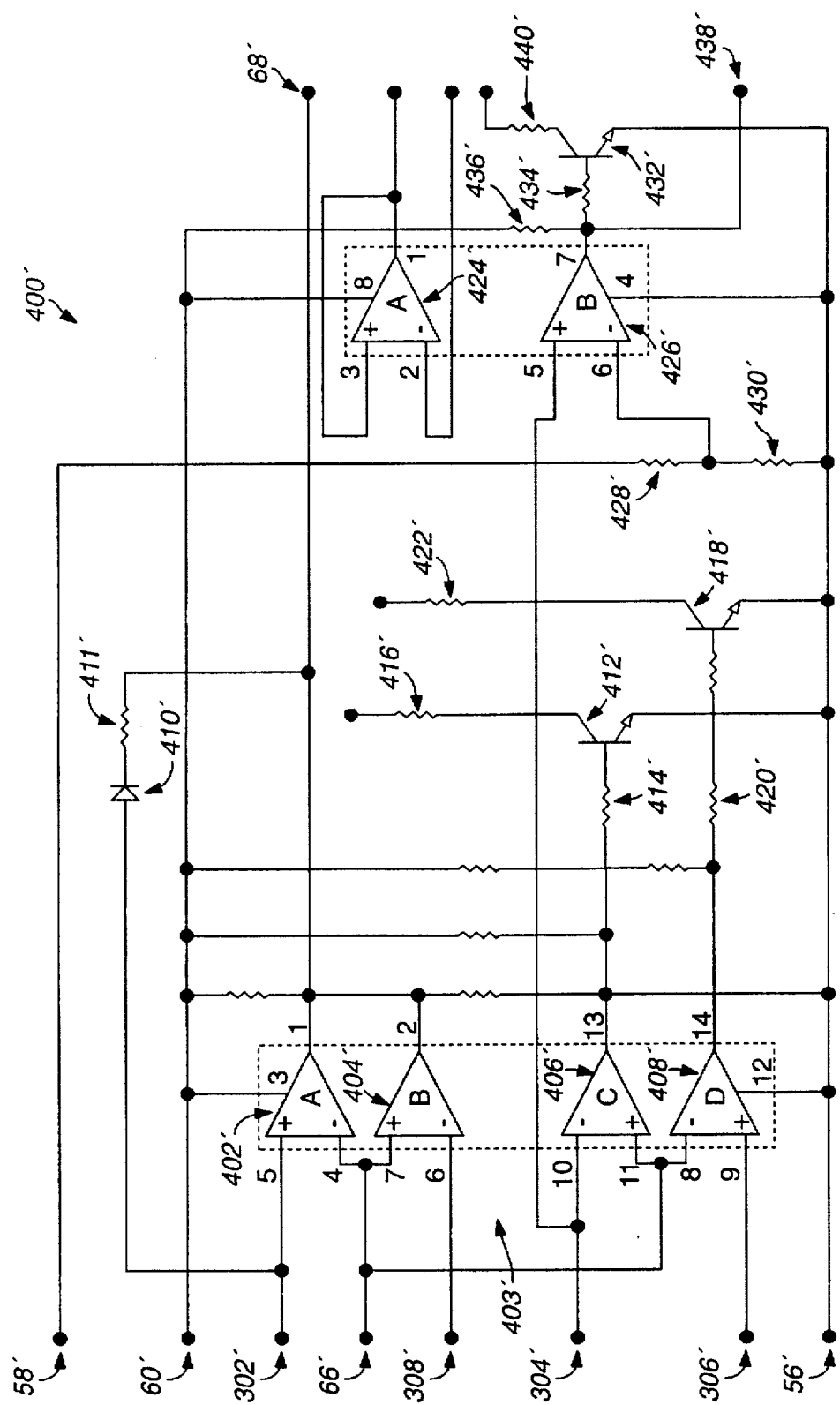
FIG. 14 is a schematic diagram of a circuit implementing the line one portion of the Comparator Circuit of the 50 Amp, 4 wire system.

FIG. 14 represents comparator circuit 400' implementing the functions of comparator circuit 18 from FIG. 1 for line one signal 50' for a 50 Amp system. FIG. 15 represents comparator circuit 1400 implementing the functions of comparator circuit 18 from FIG. 1 for line 2 1050 for a 50 Amp system. Comparator circuit is comprised of comparators 1454, 1456, 1458 and 1460 connected identically to the comparators in FIG. 14 substituting test voltage two 1066 for test voltage 66'. Lines 1450 and 1452 are connected to the bases of transistors 412' and 418', respectively.

Figure 16:
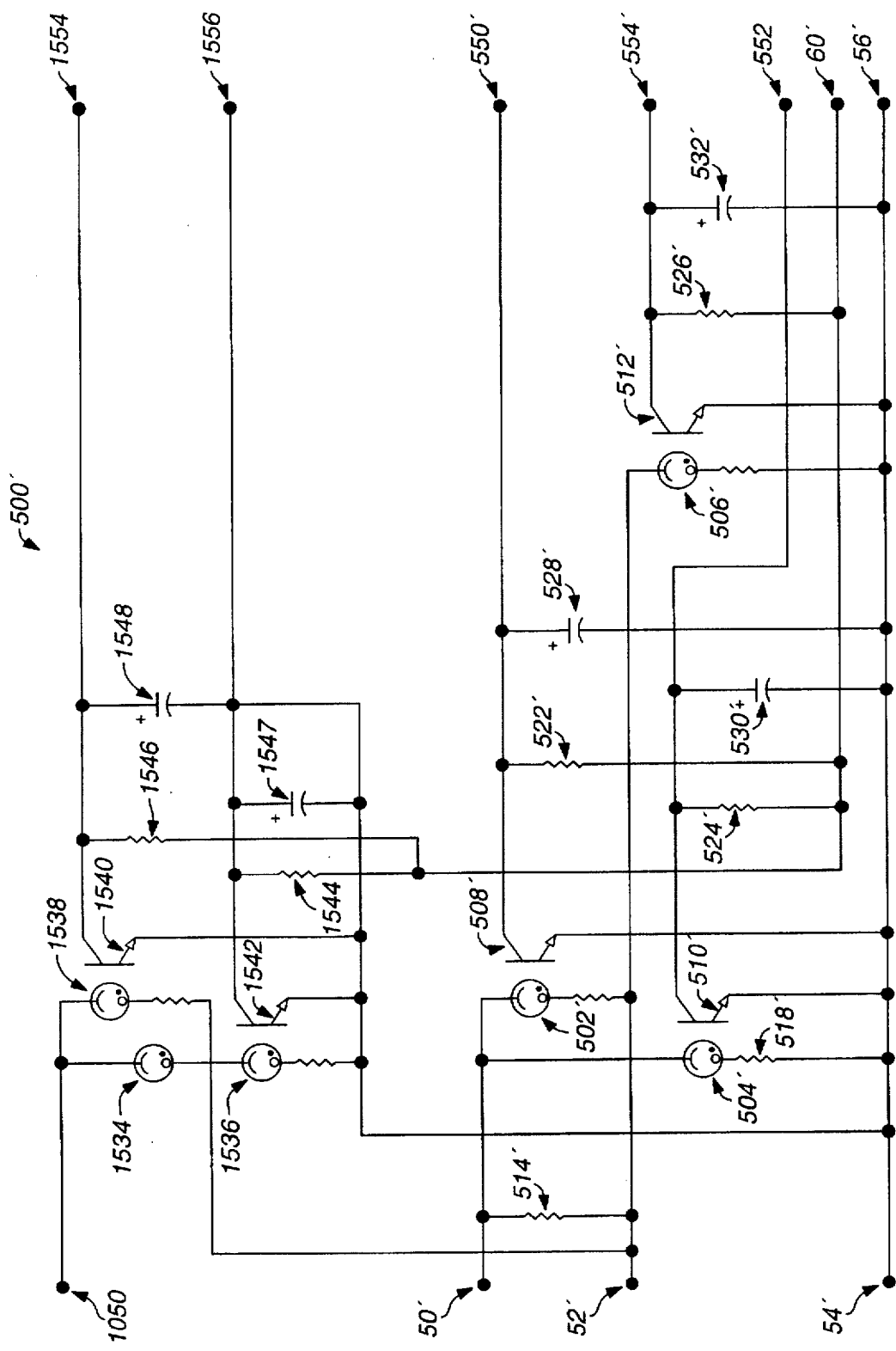
FIG. 16 is a schematic diagram of a circuit implementing a Voltage Sensing Circuit in the Polarization Error Logic of the 50 Amp, 4 wire system.
Figure 17:
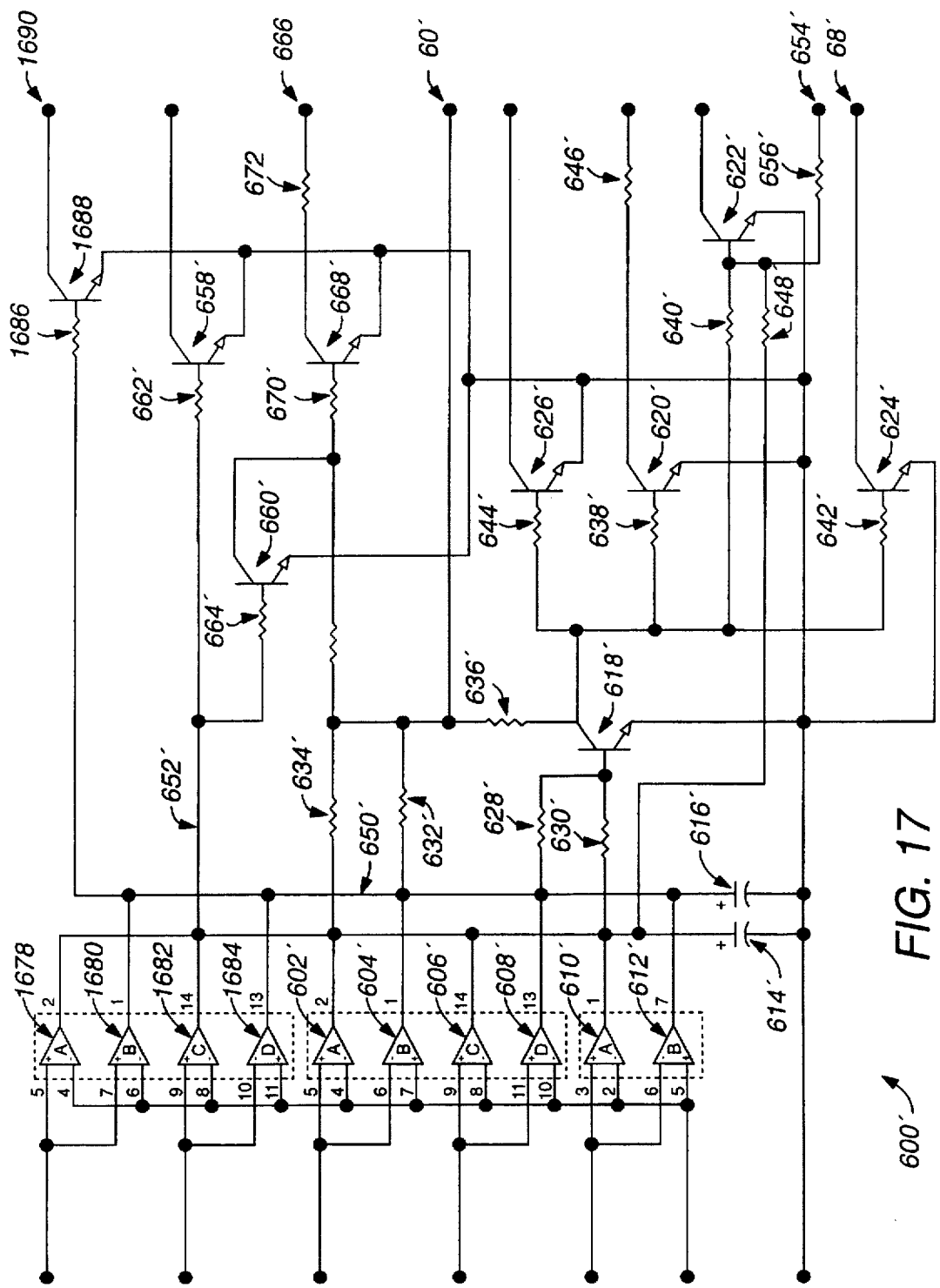
FIG. 17 is a schematic diagram of a circuit implementing a Logic Circuit in the Polarization Error Logic of the 50 Amp, 4 wire system.

FIGS. 16 and 17 represent circuits implementing polarization error logic 28 from FIG. 1. FIG. 16 shows voltage sensing circuit 500' for a 50 Amp system and includes additional neon bulbs 1534, 1536 and 1538, phototransistors 1540 and 1542, resistors 1544 and 1546, and capacitors 1547 and 1548. Neon bulbs 1534 and 1536 are connected in series between line two signal 1050 and ground 54', phototransistor 1542 is activated by neon bulb 1536. Neon bulb 1538 is connected between line two signal 1050 and neutral 52' and activates phototransistor 1540. Resistor 1544 from system voltage 60 and capacitor 1547 from system common 56 are connected to phototransistor 1542 while resistor 1546 and capacitor 1548 are connected similarly to phototransistor 1540. The output of phototransistor 1540 corresponds to line two/neutral 1554, and the output of phototransistor 1542 corresponds to line two/ground 1556.

FIG. 17 shows polarization error logic circuit 600' for a 50 Amp system and includes additional comparators 1678, 1680, 1682 and 1684. Comparators 1678 and 1680 are connected between polarization reference 64' and line two/ground 1558, while comparators 1682 and 1684 are connected between polarization reference 64' and line two/neutral 1556. The outputs of comparators 1678 and 1682 are connected to no power 652' and the outputs of comparators 1680 and 1684 are connected to normal power 650'. Additionally, normal power 650' is connected to switch transistor 1688 through resistor 1686. Switch transistor 1688 is connected to opto-couplers 1246 and 1248 from FIG. 12 through line 1690 and acts to connect line one signal 50' and line to signal 1050 to the system when normal power is present.

Figure 18:
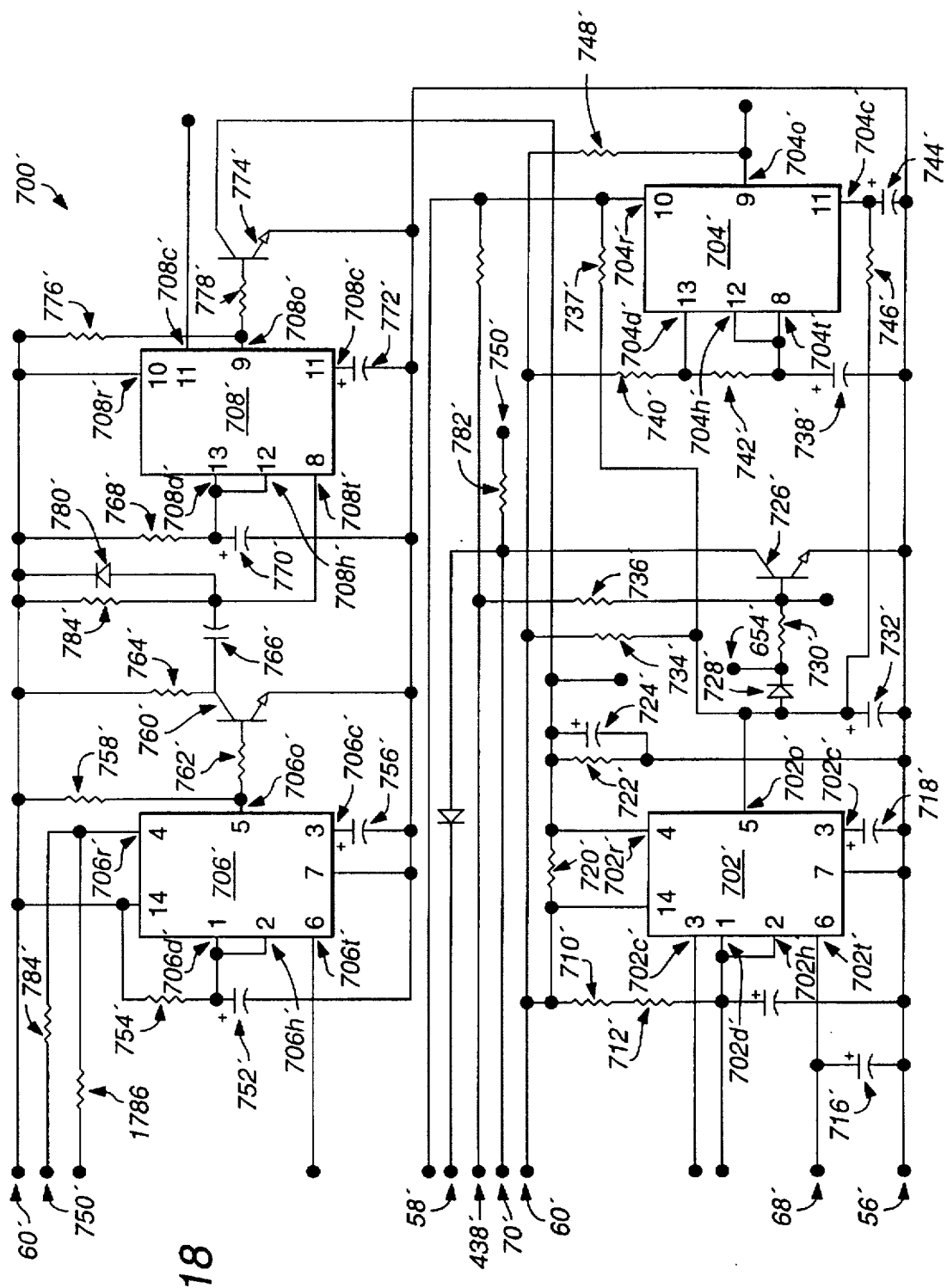
FIG. 18 is a schematic diagram of a circuit implementing the Alarm Subsystem of the 50 Amp, 4 wire system.

FIG. 18 represents alarm circuit 700' implementing the function of alarm subsystem 20 from FIG. 1 for a 50 Amp system.

Operation

The first operational difference between the 30 Amp and the 50 Amp system is found in the polarization error circuits. The four wire system presents six different voltages to the system: line-one-to-line-two, line one-to-neutral, line one-to-ground, line two-to-neutral, line two-to-ground, and neutral-to-ground. The system can detect all possible polarization errors by sensing only five of the six discrete voltages, line-one-to-line-two not being used.

Voltage sensing circuit 500' of FIG. 16 is made up of five voltage sensing circuits. The voltage sensing circuit which measures line one/neutral 550', line one/ground 552', and neutral/ground 554' do so in the same manner as the 30 Amp system shown in FIG. 6. Line two/neutral 1556 is detected directly using neon bulb 1538 and phototransistor 1540. Line two/ground 1558, however, is detected differently. Neon bulb 1534 is placed in series with neon bulb 1536. Neon bulb 1534 acts to ensure that when normal polarization is present there is not enough voltage to ionize neon bulb 1536. Neon bulb 1536 can only be ionized when there is a polarization error and reverse currents are flowing through the circuit. Phototransistor 1542 is activated when neon bulb 1536 is ionized resulting in line two/ground being at system voltage 60' when voltage is present between line two-to-ground, the opposite of the other outputs. Line two/ground also resides at system voltage 60 when none of the AC source voltages are present.

The 50 Amp system generates a normal power 650' signal when line two/ground 1558 and neutral/ground 554' are at system voltage 60 and when line two/neutral 1556, line one/neutral 550' and line one/ground 552' are at system common 56'. The 50 Amp system generates a no power signal 652' when all line two/neutral 1556, line two/ground 1558, line one/neutral 550', line one/ground 552' and neutral/ground are at system voltage 60'. Any other combination represents a polarization error. All other polarization logic circuits operate in the same manner as the 30 Amp system.

The second operational difference between the 30 Amp and 50 Amp circuits arises in the voltage monitoring logic where a second DC test voltage, proportional to input AC voltage line two signal 1050 to neutral, is developed by scaling circuit 1332 of FIG. 13 and monitored in comparator circuit 1400 of FIG. 15. Comparator circuit 1400 operates independently of comparator circuit 400' and can pull alarm trigger 68' low or cause the activation of high warning light 814' or low warning light 802' even when line one signal 50' is within acceptable limits.

The third operational difference between the 30 Amp and 50 Amp circuits arises in the additional input to low delay trigger reset 706r' provided by resistor 1786 connected between the output of comparator 1460 and the low delay trigger reset 706r' shown in FIG. 18. With the circuit configuration of the low delay trigger 706', if either comparator 460' or comparator 1460 is turned on as a result of either test voltage 66' or test voltage 1066 being lower than low warning light voltage 306', then low delay trigger reset 706r' is pulled up to enable low delay trigger 706' and allow it to be triggered by a subsequent alarm trigger 60' signal.

All components shown in FIGS. 2–9 and FIGS. 11–18 are standard electrical parts and are readily available. All components can be purchased from one or more of the following: Digi-Key Corp, Thief River Falls, Minn., Radio Shack, Fort Worth, Tex., and Grainger, Lincolnshire, Ill. Specific components, excluding simple resistors and capacitors, used in the preferred embodiment are as follows:

| DESIGNATOR | VALUE | | DESIGNATOR | VALUE |
|---|---|---|---|---|
| | | SURGE PROTECTORS | | |
| 106 | 300-V | | | PANASONIC ZNR P7202-ND |
| 108 | 300-V | | | PANASONIC ZNR P7202-ND |
| 110 | 300-V | | | PANASONIC ZNR P7202-ND |
| 216 | 20-V | | | PANASONIC ZNR P7202-ND |
| 1106 | 300-V | | | PANASONIC ZNR P7202-ND |
| 1108 | 300-V | | | PANASONIC ZNR P7202-ND |
| 1110 | 300-V | | | PANASONIC ZNR P7202-ND |
| | | CIRCUIT BREAKERS | | |
| 212 | 30-V | | | RAYCHEM RUE-110-ND |
| 206 | 250-V | | | RAYCHEM TR-180U-ND |
| 1206 | 250-V | | | RAYMCHEM TR-180U-ND |
| | | SWITCHES | | |
| 838 | SPST | TOGGLE | 834 | MOM-NO |
| 836 | SPST | TOGGLE | 832 | MOM-NO |
| 816 | SPST | TOGGLE | 830 | MOM-NO |
| 824 | SPST | TOGGLE | | |
| | | TRANSISTORS | | |
| 508 | PN154PA | | 624 | 2N3904 |
| 510 | PN154PA | | 412 | 2N3904 |
| 512 | PN154PA | | 418 | 2N3904 |
| 618 | 2N3904 | | 432 | 2N3904 |
| 1688 | 2N3904 | | 726 | TIP31C |
| 658 | 2N3904 | | 760 | 2N3904 |
| 660 | 2N3904 | | 774 | 2N3904 |
| 668 | 2N3904 | | 1540 | PN154PA |
| 626 | TIP31C | | 1542 | PN154PA |
| 620 | 2N3904 | | | |
| 622 | 2N3904 | | | |
| | | ELECTRONICS | | |
| 222 | 7806 | | 702 & 704 | NE556 |
| 230 | 7806 | | 706 & 708 | NE556 |
| ALL | | | 1248 | MCP3020QT |
| COMPARATORS | LM393 | | 1246 | MCP3020QT |
| | | DIODES | | |
| 214 | 1N4005 | | 728 | 1N914 |
| 240 | 1N4005 | | 780 | 1N914 |
| 410 | 1N914 | | | |
| 828 | 1N4736 | 6.8V-1W | | |
| | | LED'S | | |
| 818 | RED | T 1¾ | | |
| 802 | YELLOW | T 1¾ | | |
| 804 | RED | T 1¾ | | |
| 806 | GREEN | T 1¾ | | |
| 808 | RED | T 1¾ | | |
| 810 | GREEN | T 1¾ | | |
| 812 | YELLOW | T 1¾ | | |
| 814 | RED | T 1¾ | | |
| | | SPEAKERS | | |
| 104 | HORN | | 202 | 12.6V-450MA |
| 820 | BEEPER | | 1202 | 12.6V-450MA |
| | | NEON BULBS | | |
| 502 | NE-2 NEON | | 1538 | NE-2 NEON |
| 504 | NE-2 NEON | | 1536 | NE-2 NEON |
| 506 | NE-2 NEON | | 1534 | NE-2 NEON |
| | | RELAYS | | |
| 102 | DPDT-30Z/12VDC | DAYTON-GRAINGER 3 × 748 | | |
| 237 | SPST-1A/12VD DIP | HAMLIN HE721A1200 | | |
| 1102 | DPDT-30A/12VDC | DAYTON-GRAINGER 3 × 748 | | |

Although not shown in the preferred embodiment, the invention can be modified to add another normally closed relay which is used to open the AC source neutral and ground conductors. This addition would completely disconnect the load form the AC power source thereby removing any possibility of electrical shock in the case of a polarization error. To illustrate, a source power line miswired to the load ground, an RV chassis for example, would be detected as a polarization error, and the resultant action of the invention would be to disconnect all source power conductors thereby removing the shock hazard to the RV occupants.

An alternate embodiment replaces the present analog decision and logic circuits with a control program executed in a microprocessor and making use of support electronic circuits and devices to produce various input signals to the microprocessor and to respond to control instructions from the microprocessor such as the activation of the disconnection means. For example, the control program and microprocessor could take over the functions of the polarization error logic, the comparator circuits and all the timing functions.

It should be understood that various modifications can be made to the embodiments disclosed without departing from the spirit and scope of the present invention. Various engineering changes and choices can also be made without departing substantially from the spirit of the disclosure.

I claim:

1. A control system for automatically and continuously controlling a connection of AC power between an AC load and an AC power source having at least one output voltage, the control system comprising:
   a) a polarization error circuit to detect a wiring polarization error in the connections of the AC power source to the AC load, the connections including at least one power connection, a neutral connection and a ground connection;
   b) a comparator circuit to detect a fault condition when at least one output voltage of the AC power source is outside a predetermined AC voltage operating window; and
   c) a relay connected to the polarization error circuit and the comparator circuit, the relay activated to disconnect power from the AC load when the comparator circuit detects the fault condition or the polarization error circuit detects the wiring polarization error.

2. The control system of claim 1 further comprising a timing circuit connected to the relay to deactivate the relay if the comparator circuit fails to detect a fault condition when a timing period has ended.

3. The control system of claim 1 wherein the relay acts to disconnect power from the AC load immediately when at least one output voltage is above a high voltage limit, and wherein the relay disconnects the AC load after a delay when at least one output voltage is below a low voltage limit.

4. The control system of claim 1 further comprising an independent DC power supply connected to the control system to supply power to the control system.

5. The control system of claim 4 wherein the independent DC power supply is a rechargeable battery.

6. The control system of claim 1 wherein the polarization error circuit comprises:
   a) at least one voltage sensing circuit to sense at least one output voltage from the AC power source; and
   b) a plurality of comparators connected to the at least one voltage sensing circuit to determine when a polarization error is present in connecting the AC power source to the AC load.

7. The control system of claim 1 wherein the comparator circuit is comprised of a plurality of discrete comparators, the plurality of discrete comparators comparing at least one DC input voltage corresponding to the at least one output voltage to a DC high reference voltage and a DC low reference voltage.

8. The control system of claim 1 wherein the relay is a DC relay.

9. A control system for automatically and continuously controlling a connection of power between an AC load and an AC power source having at least one output voltage, the control system comprising:
   a) an independent DC power supply to power the control system;
   b) a polarization error circuit to detect wiring polarization errors between at least one power conductor, a neutral conductor, and a ground conductor which connect the AC power source to the AC load, the polarization error circuit including at least three light sources and at least three light sensitive electronic devices to detect voltages between the at least one power conductor, the neutral conductor and the ground conductor, the voltages used to determine if a wiring polarization error exists;
   c) a comparator circuit W compare at least one output voltage of the AC power source to a predetermined high reference voltage and a predetermined low reference voltage; and
   d) a relay activated to disconnect the power source from the AC load when at least one output voltage of the AC power source is above the predetermined high reference voltage or below the predetermined low reference voltage, or to disconnect the AC load if a polarization error is detected by the polarization error circuit.

10. The control system of claim 9 wherein the relay is activated immediately to disconnect the AC load when at least one output voltage of the AC power source is above the predetermined high reference voltage, and wherein the relay is activated after a preset time delay to disconnect the AC load when at least one output voltage of the AC power source is below the predetermined low reference voltage.

11. The control system of claim 9 wherein the relay is a DC relay.

12. A control system for automatically and continuously controlling a connection of power between an AC load and an AC power source having at least one output voltage, the control system comprising:
   a) an independent DC power supply connected to the control system to power the control system;
   b) a reference voltage generator connected to the independent DC power supply to develop a DC high reference voltage and a DC low reference voltage;
   c) a rectifying circuit connected to the power source to develop a DC input voltage corresponding to at least one output voltage of the AC power source;
   d) a comparator circuit connected to the rectifying circuit and to the reference voltage generator to determine if the DC input voltage is between the DC high reference voltage and the DC low reference voltage and to generate a fault condition signet when the DC input voltage is above the high reference voltage or below the low reference voltage:
   e) a polarization error circuit connected to the AC power source, wherein the polarization error circuit detects a wiring polarization error when the AC power source is misconnected to the AC load, including misconnections which involve a neutral connection or a ground connection, the polarization error circuit including at least three light sources and at least three light sensitive electronic devices to detect voltages between at least one power conductor, a neutral conductor and a ground conductor, the voltages being used to determine if a wiring polarization error exists;
   f) a DC relay connected between the AC power source and the AC load, the relay activated to disconnect the AC power source from the AC load when the comparator circuit generates the fault condition signal or the polarization error circuit detects the wiring polarization error; and g) a timing circuit connected to the relay to keep the power source disconnected until the fault condition signal is absent and a minimum period of time has elapsed.

13. The control system of claim 12 wherein the comparator circuit is comprised of a plurality of discrete comparators.

14. The control system of claim 12 wherein the polarization error circuit is comprised of at least three neon bulbs and at least three phototransistors associated with each of the at least three neon bulbs.

15. A method for automatically and continuously controlling a connection of AC power between an AC load and an AC power source having at least one output voltage, the method comprising the steps of:

(a) sensing a presence or absence of voltage between individual lines of the AC power source, the individual lines including at least one power line, a neutral line and a ground line;

(b) determining whether there is a polarization error in the AC power source based on the presence or absence of voltage between the individual lines of the AC power source including polarization errors involving the neutral line and ground line;

(c) creating a test voltage proportional to the at least one output voltage;

(d) monitoring the test voltage to ensure that the test voltage is within a predetermined operating window; and (e) activating a DC relay to disconnect the AC power source from the AC load if a polarization error is detected or if the test voltage is outside the predetermined operating window.

16. The method of claim 15, after step (e), further comprising the step of deactivating the relay if the test voltage is within the predetermined operating window and no polarization error is detected when a timing period has ended.

17. The method of claim 15, wherein the predetermined operating window is comprised of a high voltage limit and a low voltage limit, step (e) further comprising activating the DC relay to disconnect power from the AC load immediately when the test voltage is above a high voltage limit, and wherein the relay disconnects the AC load after a delay when the test voltage is below the low voltage limit.

* * * * *